(12) United States Patent
Usui

(10) Patent No.: US 9,355,788 B2
(45) Date of Patent: May 31, 2016

(54) DYE-SENSITIZED SOLAR CELL AND METHOD OF MANUFACTURING THE SAME

(71) Applicant: FUJIKURA LTD., Tokyo (JP)

(72) Inventor: Hiroki Usui, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/549,699

(22) Filed: Nov. 21, 2014

(65) Prior Publication Data

US 2015/0075618 A1   Mar. 19, 2015

Related U.S. Application Data

(63) Continuation of application No. PCT/JP2013/055100, filed on Feb. 27, 2013.

(30) Foreign Application Priority Data

May 22, 2012  (JP) .................................. 2012-116121

(51) Int. Cl.
*H01G 9/20* (2006.01)
*H01G 9/00* (2006.01)

(52) U.S. Cl.
CPC ........... *H01G 9/2077* (2013.01); *H01G 9/0029* (2013.01); *H01G 9/2031* (2013.01); *H01G 9/2059* (2013.01); *Y02E 10/542* (2013.01); *Y02P 70/521* (2015.11)

(58) Field of Classification Search
CPC ..... H01G 9/0029; H01G 9/20; H01G 9/2077; H01G 9/2031; H01G 9/2059
USPC ......................................... 136/251, 256, 259
See application file for complete search history.

(56) References Cited

U.S. PATENT DOCUMENTS

| 2004/0238026 A1 | 12/2004 | Miyoshi |
| 2009/0250104 A1 | 10/2009 | Inoue et al. |
| 2012/0006406 A1 | 1/2012 | Usui et al. |

FOREIGN PATENT DOCUMENTS

| EP | 2 352 200 A1 | 8/2011 |
| EP | 2 352 203 A1 | 8/2011 |

(Continued)

OTHER PUBLICATIONS

International Search Report for PCT/JP2013/055100 dated Apr. 9, 2013, English Translation.

(Continued)

*Primary Examiner* — Susan D Leong
(74) *Attorney, Agent, or Firm* — Sughrue Mion, PLLC

(57) ABSTRACT

Disclosed is a dye-sensitized solar cell which includes a conductive substrate, a counter substrate facing the conductive substrate, an electrolyte disposed between the conductive substrate and the counter substrate, and an annular sealing portion surrounding the electrolyte together with the conductive substrate and the counter substrate and connecting the conductive substrate and the counter substrate. The sealing portion has an inorganic sealing portion fixed to the conductive substrate and a resin sealing portion fixed to the counter substrate. The inorganic sealing portion has a main body portion provided on the conductive substrate and a protruding portion extending from the main body portion toward a side opposite to the conductive substrate, and the resin sealing portion has an adhesive portion adhering the main body portion to the counter substrate and adhered to a side surface along an extending direction of the protruding portion.

11 Claims, 15 Drawing Sheets

(56) References Cited

FOREIGN PATENT DOCUMENTS

| EP | 2 461 419 A1 | 6/2012 |
|---|---|---|
| EP | 2 555 315 | 2/2013 |
| EP | 2 854 213 | 4/2015 |
| JP | 2009-277399 A | 11/2009 |
| JP | 2010-123556 A | 6/2010 |
| JP | 4504456 B1 | 7/2010 |
| JP | 2010-198821 A | 9/2010 |
| JP | 2011-49140 A | 3/2011 |
| JP | 2011-222140 A | 11/2011 |
| JP | 2014-123429 | 7/2014 |
| WO | 2010/050207 A1 | 5/2010 |
| WO | 2011/013423 | 2/2011 |
| WO | 2011/125843 | 10/2011 |

OTHER PUBLICATIONS

Japanese Office Action issued Oct. 27, 2015 in Japanese Patent Application No. 2014-516688.

Communication dated Dec. 23, 2015 from the European Patent Office in counterpart application No. 13793081.4.

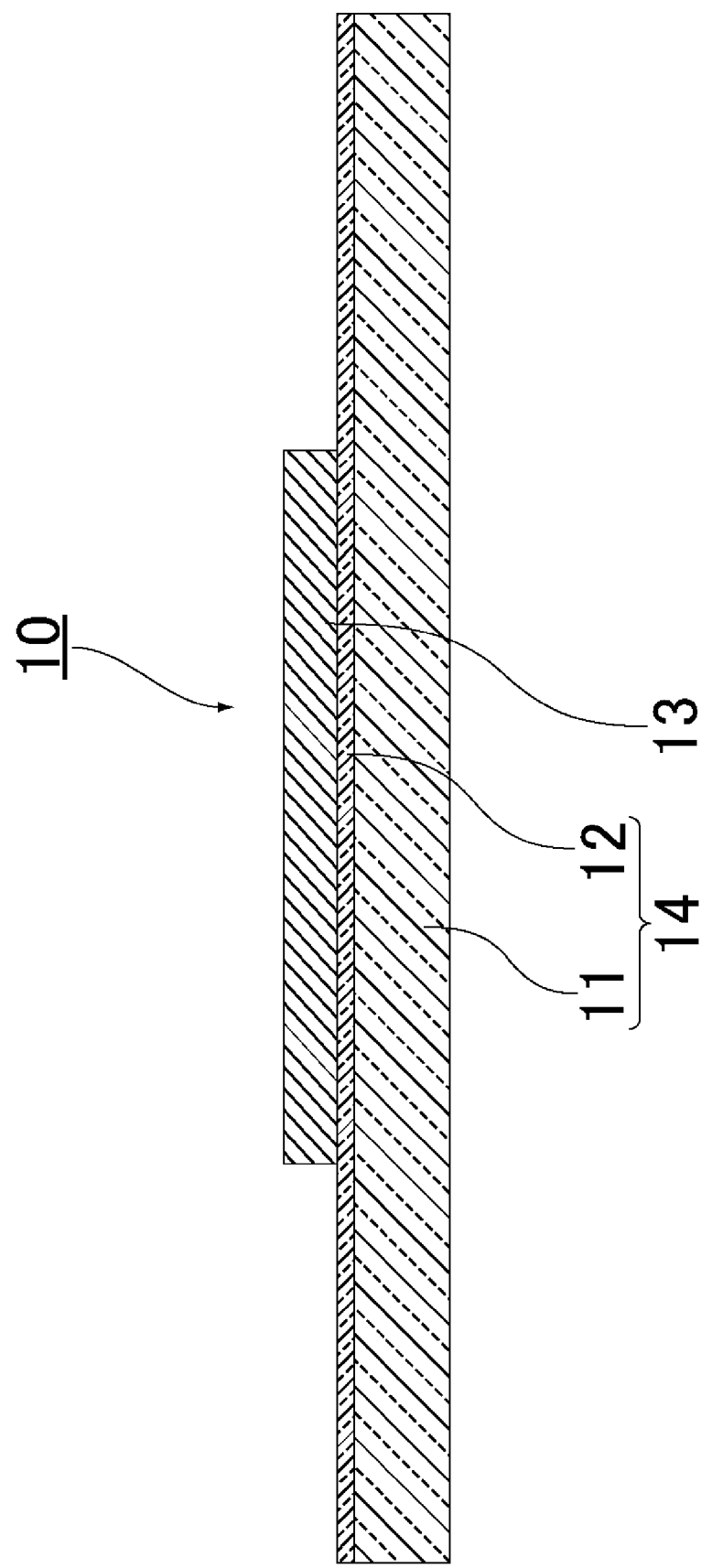

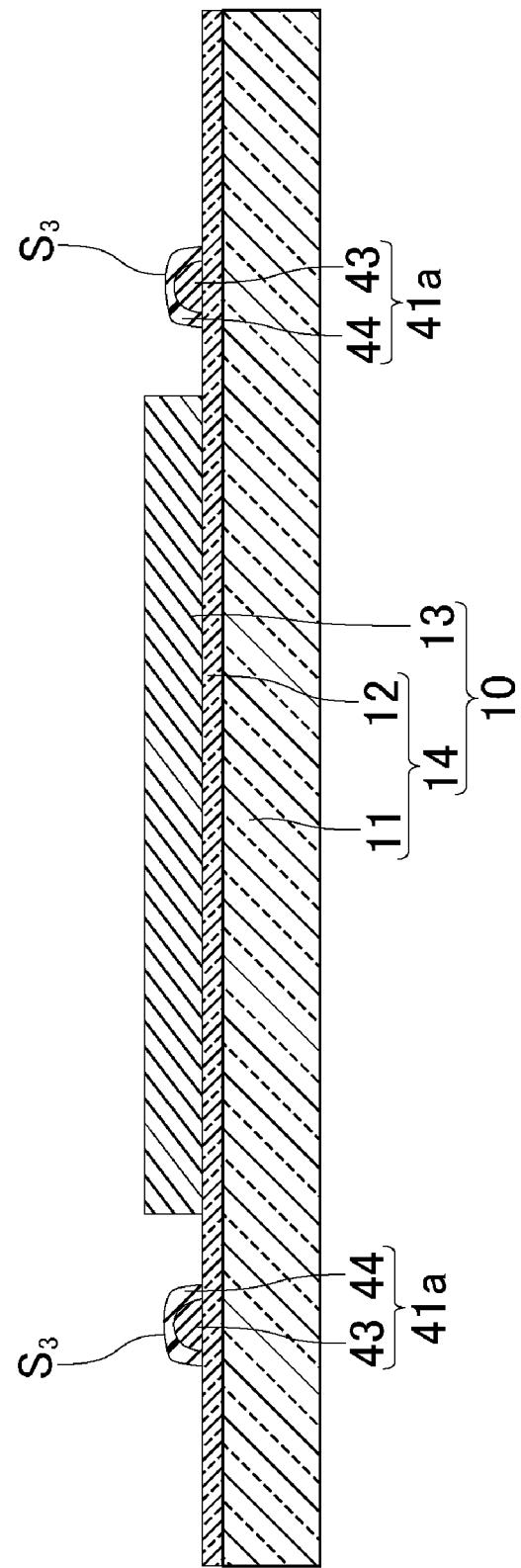

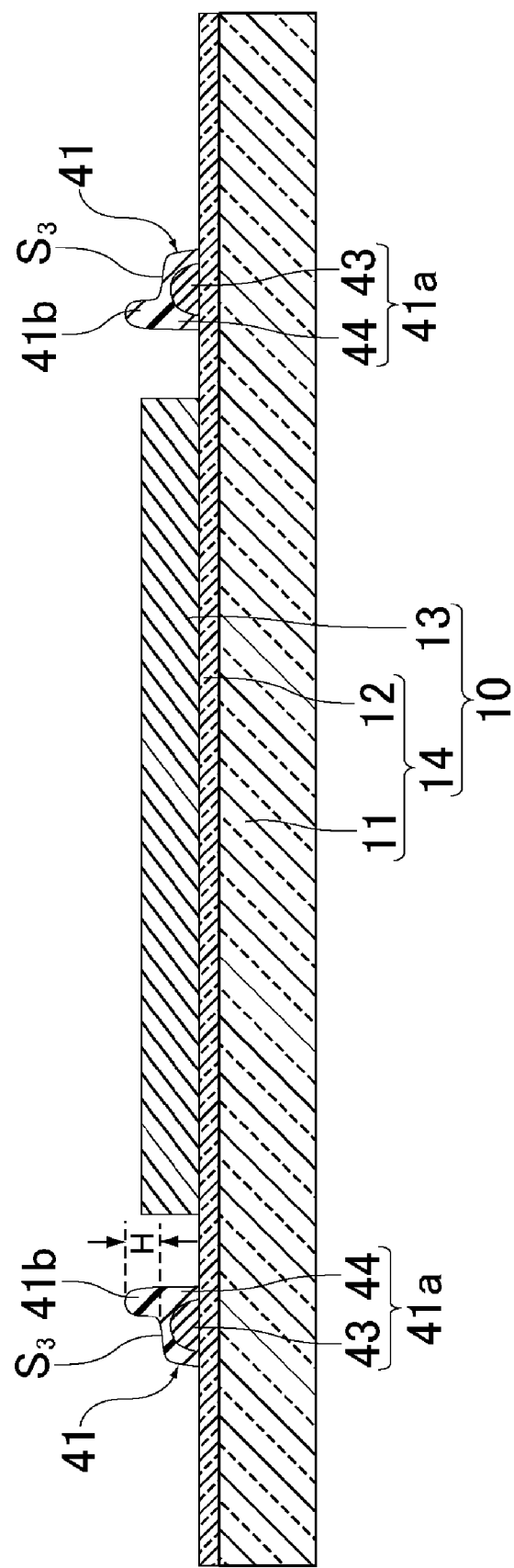

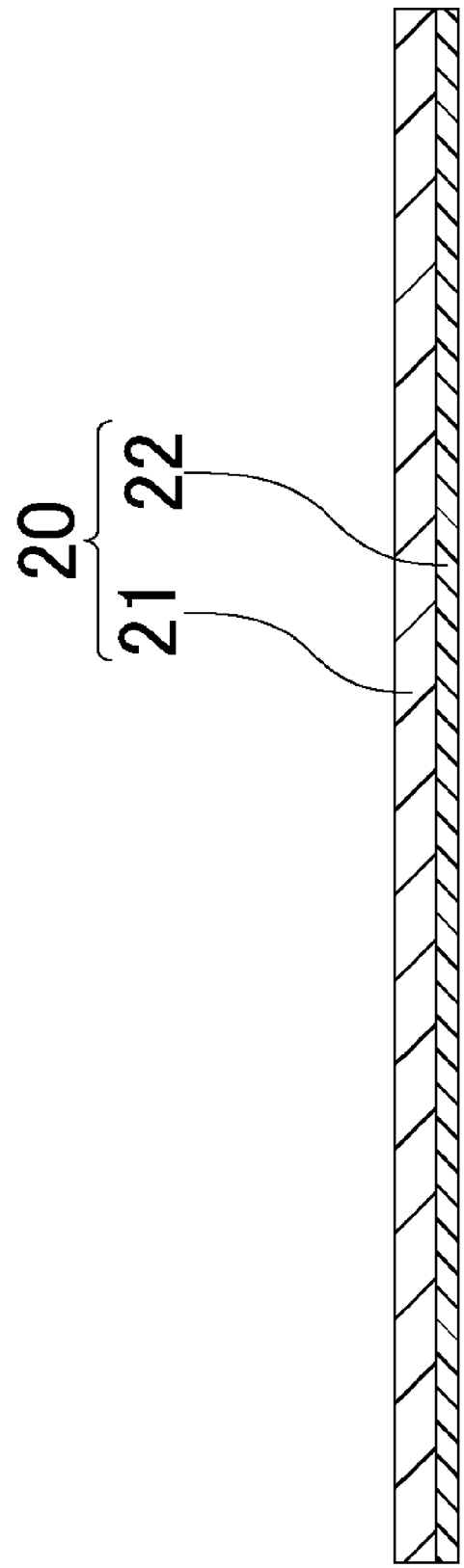

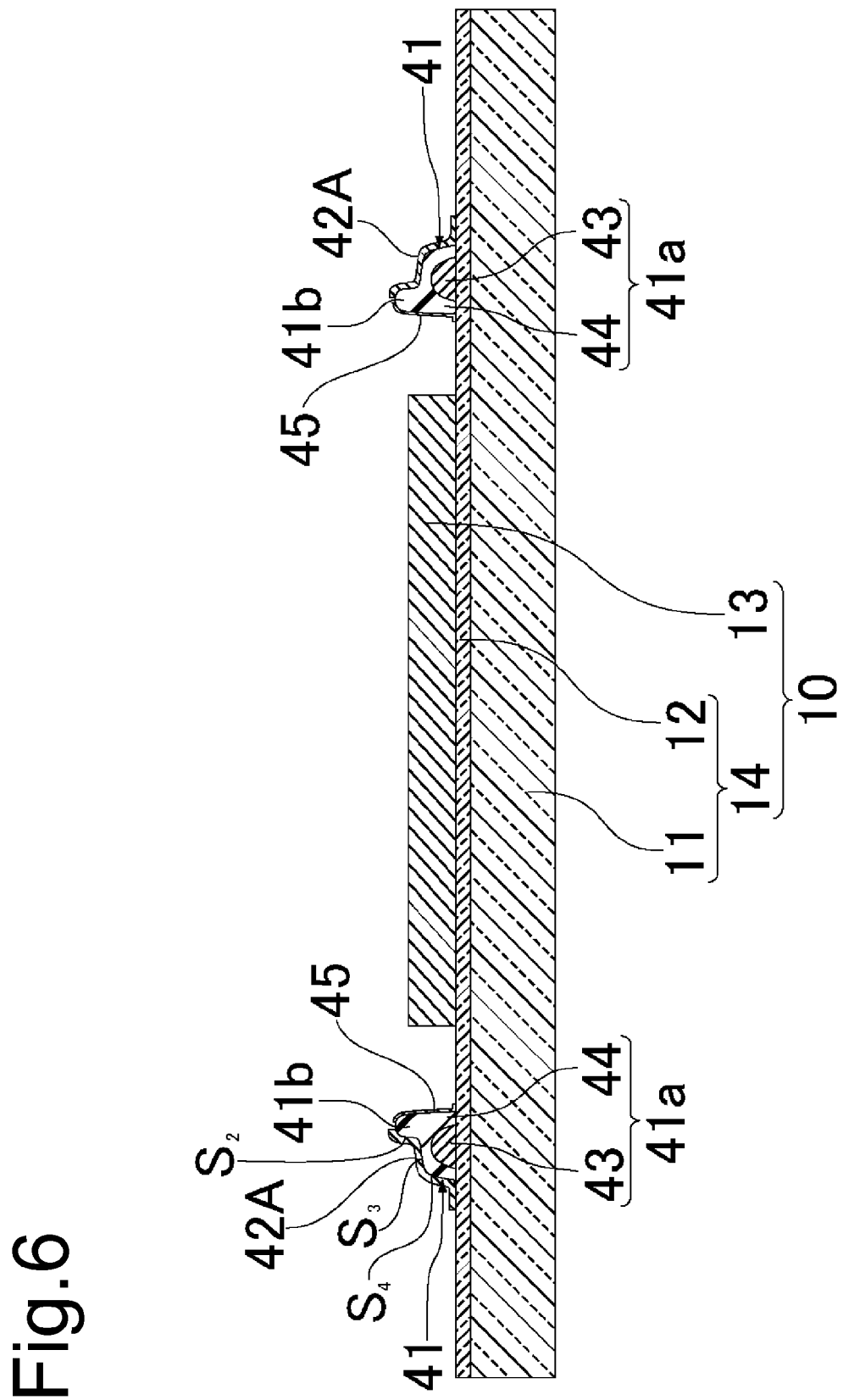

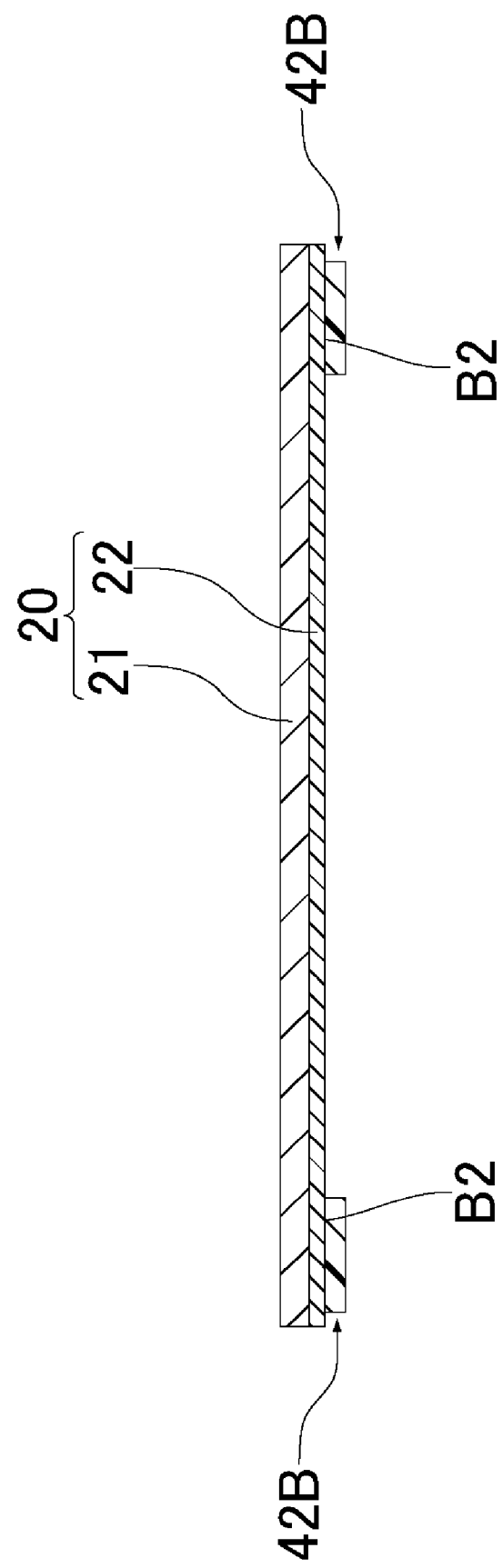

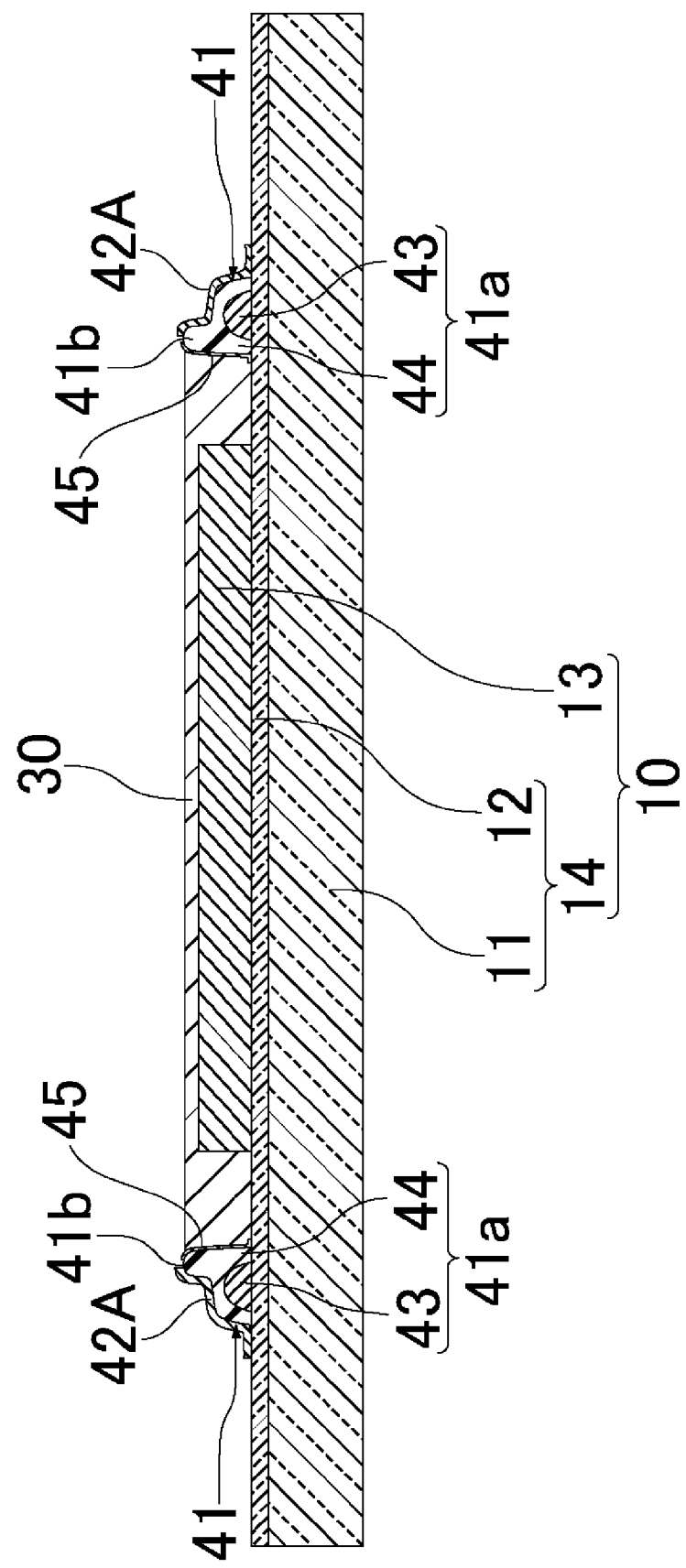

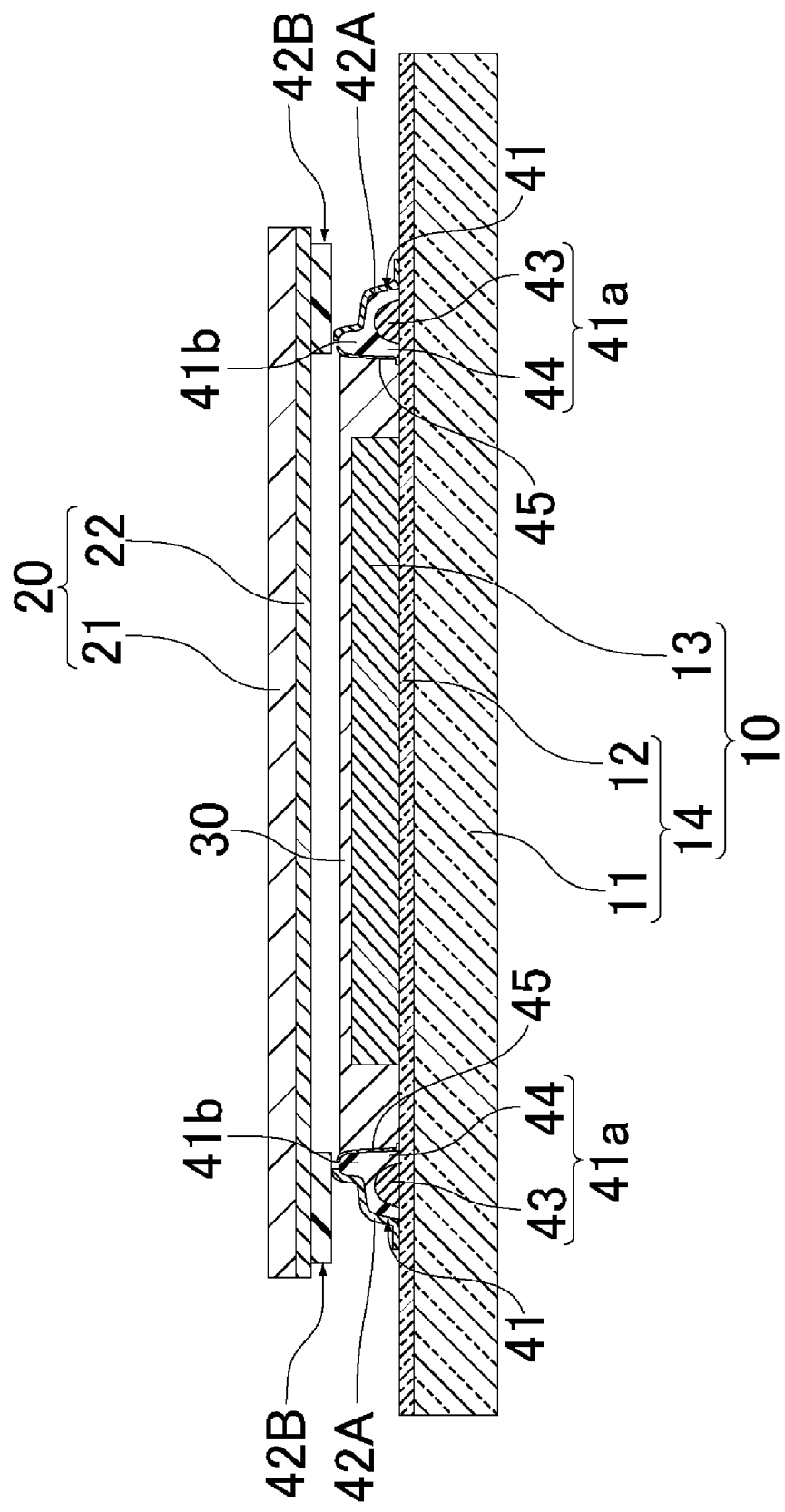

DYE-SENSITIZED SOLAR CELL AND METHOD OF MANUFACTURING THE SAME

CROSS REFERENCE TO RELATED APPLICATIONS

This application is a Continuation of National Stage of International Application No. PCT/JP2013/055100 filed Feb. 27, 2013, claiming priority based on Japanese Patent Application No. 2012-116121 filed May 22, 2012, the contents of all of which are incorporated herein by reference in their entirety.

TECHNICAL FIELD

The present invention relates to a dye-sensitized solar cell and a method of manufacturing the same.

BACKGROUND ART

A dye-sensitized solar cell has attracted attention as a photoelectric conversion element since it is inexpensive and high photoelectric conversion efficiency is obtained therefrom, and various developments have been conducted with regard to the dye-sensitized solar cell.

A dye-sensitized solar cell is generally equipped with a conductive substrate, a counter substrate such as a counter electrode, an electrolyte disposed between the conductive substrate and the counter substrate, and a sealing portion to connect the conductive substrate and the counter substrate.

As such a dye-sensitized solar cell, for example, a photoelectric conversion device disclosed in the following Patent Document 1 is known. In the following Patent Document 1, it is described that the sealing portion constituting the photoelectric conversion device is equipped with an inorganic sealing portion which is fixed to the conductive substrate of a working electrode and constituted by an inorganic material and a resin sealing portion which connects the counter electrode and the inorganic sealing portion and is constituted by a resin material, and it has been proposed that the time-dependent change of the photoelectric conversion efficiency is sufficiently suppressed by the photoelectric conversion device having such a sealing portion.

CITATION LIST

Patent Document

Patent Document 1: WO 2010/050207 A

SUMMARY OF THE INVENTION

Problem to be Solved by the Invention

However, the photoelectric conversion device disclosed in Patent Document 1 described above still has a room for improvement in terms of durability in a high temperature environment.

The invention has been achieved in view of the above circumstance, and an object thereof is to provide a dye-sensitized solar cell exhibiting excellent durability even in a high temperature environment and a method of manufacturing the same.

Means for Solving Problem

The present inventor has conducted investigations on the factor causing the above problem. First, there is a concern in the photoelectric conversion device disclosed in Patent Document 1 above that the distance between the conductive substrate of the working electrode and the counter electrode (hereinafter, referred to as the "inter-electrode distance") greatly decreases when the device is placed in a high temperature environment and thus the resin sealing portion excessively softens compared to the inter-electrode distance before the resin sealing portion excessively softens, and the present inventor has considered that this fact may be the factor causing the above problem. Here, it is also considered to decrease the thickness of the resin sealing portion. This is because it is possible to suppress that the inter-electrode distance greatly decreases compared to the inter-electrode distance before the resin sealing portion excessively softens since the maximum decrease amount in the thickness of the resin sealing portion can be lowered even when the resin sealing portion is excessively softened in a high temperature environment if the thickness of the resin sealing portion is reduced. However, in this case, there is a concern that the adhesive force of the resin sealing portion with respect to the counter electrode is lowered and thus the resin sealing portion is easily peeled off from the counter electrode since the thickness of the resin sealing portion is reduced. Hence, the present inventor has conducted further intensive investigations and have found that the above problem can be solved by the following invention.

In other words, the invention is a dye-sensitized solar cell which includes a conductive substrate, a counter substrate facing the conductive substrate, an electrolyte disposed between the conductive substrate and the counter substrate, and an annular sealing portion surrounding the electrolyte together with the conductive substrate and the counter substrate and connecting the conductive substrate and the counter substrate, in which the sealing portion has an inorganic sealing portion fixed to the conductive substrate and containing an inorganic material and a resin sealing portion fixed to the counter substrate and containing a resin material, the inorganic sealing portion has a main body portion provided on the conductive substrate and a protruding portion extending from the main body portion toward a side opposite to the conductive substrate, and the resin sealing portion has an adhesive portion adhering the main body portion to the counter substrate and adhered to a side surface along an extending direction of the protruding portion.

According to this dye-sensitized solar cell, the adhesive portion included in the resin sealing portion softens when the dye-sensitized solar cell is placed in a high temperature environment. At this time, the inorganic sealing portion has a protruding portion extending from the main body portion toward the side opposite to the conductive substrate in the dye-sensitized solar cell of the invention. Here, the main body portion and the protruding portion can be maintained in a rigid state even if the adhesive portion included in the resin sealing portion softens since the main body portion and the protruding portion included in the inorganic sealing portion are composed of an inorganic material. Hence, it is prevented that the counter substrate comes close to the main body portion since the counter substrate comes in contact with the protruding portion even if the adhesive portion included in the resin sealing portion softens, the thickness of the adhesive portion decreases, and thus the counter substrate is likely to come close to the main body portion of the inorganic sealing portion. For this reason, it is sufficiently suppressed that the thickness of the adhesive portion of the resin sealing portion decreases, and the deterioration in the adhesive property of the adhesive portion with respect to the counter substrate is sufficiently suppressed. Accordingly, it is sufficiently suppressed that the adhesive portion is peeled off from the counter substrate. Consequently, according to the dye-sensitized solar cell of the invention, it is possible to exhibit excellent durability even in a high temperature environment.

In the dye-sensitized solar cell, it is preferable that a melting point of the protruding portion be higher than a melting point of the adhesive portion.

In the dye-sensitized solar cell, it is preferable that at least a part of the adhesive portion be provided on a side opposite to the electrolyte with respect to the protruding portion.

In this case, the degradation of the adhesive portion by the electrolyte is more sufficiently suppressed compared to a case in which the entire adhesive portion is on the electrolyte side with respect to the protruding portion. For this reason, it is possible that the dye-sensitized solar cell exhibits more excellent durability.

In the dye-sensitized solar cell, it is preferable that the resin sealing portion further have an expanding portion expanding to the side opposite to the protruding portion with respect to the adhesive portion and adhered to a region, in which the adhesive portion is not adhered, of the main body portion of the inorganic sealing portion.

In this case, the resin sealing portion is adhered to the region, in which the adhesive portion is not adhered, of the main body portion of the inorganic sealing portion by the expanding portion in addition to being adhered to the main body portion of the inorganic sealing portion by the adhesive portion. For this reason, the adhesive portion is reinforced when the resin sealing portion has the expanding portion compared to the case of not having the expanding portion. In other words, the adhesive portion is not peeled off from the counter substrate easily even when an excessive stress is applied to the adhesive portion since the adhesive portion is reinforced by the expanding portion. Consequently, it is possible that the dye-sensitized solar cell exhibits more excellent durability.

In the dye-sensitized solar cell, it is preferable that a height of the protruding portion from the main body portion be from 20 to 100 µm.

In this case, it is possible to hold the minimum thickness of the adhesive portion at from 20 to 100 µm even when the dye-sensitized solar cell is placed in a high temperature environment and thus the adhesive portion included in the resin sealing portion softens. For this reason, it is possible to more sufficiently secure the adhesive property of the adhesive portion with respect to the counter substrate compared to a case in which the height of the protruding portion is less than 20 µm. In addition, thinning of the dye-sensitized solar cell is possible since the interval between the conductive substrate and the counter substrate (hereinafter, referred to as the "distance between substrates" in some cases) is narrower compared to a case in which the height of the protruding portion exceeds 100 µm.

The dye-sensitized solar cell may have a first electrode having the conductive substrate, and the counter substrate may be constituted by a second electrode.

In addition, the invention is a method of manufacturing a dye-sensitized solar cell which includes an inorganic sealing portion forming step of forming an inorganic sealing portion including an inorganic material on a conductive substrate, a counter substrate preparing step of preparing a counter substrate, an electrolyte disposing step of disposing an electrolyte on the conductive substrate or the counter substrate, and a bonding step of forming a sealing portion between the conductive substrate and the counter substrate by bonding the conductive substrate and the counter substrate, in which the inorganic sealing portion is formed so as to have a main body portion provided on the conductive substrate, and a protruding portion extending from the main body portion toward a side opposite to the conductive substrate in the inorganic sealing portion forming step, and the sealing portion is formed so as to have an inorganic sealing portion and a resin sealing portion fixed to the counter substrate and including a resin material, and the resin sealing portion is formed so as to have an adhesive portion adhering the main body portion to the counter substrate and adhered to a side surface along an extending direction of the protruding portion in the bonding step.

In this manufacturing method, the following effect is obtained in the dye-sensitized solar cell to be obtained. In other words, the adhesive portion included in the resin sealing portion softens when the dye-sensitized solar cell obtained by the manufacturing method described above is placed in a high temperature environment. At this time, the inorganic sealing portion has a protruding portion extending from the main body portion toward the side opposite to the conductive substrate in the dye-sensitized solar cell obtained by the method of manufacturing a dye-sensitized solar cell of the invention. Here, the main body portion and the protruding portion can be maintained in a rigid state even if the adhesive portion included in the resin sealing portion softens since the main body portion and the protruding portion included in the inorganic sealing portion are composed of an inorganic material. Hence, it is prevented that the counter substrate comes close to the main body portion since the counter substrate comes in contact with the protruding portion even if the adhesive portion included in the resin sealing portion softens, the thickness of the adhesive portion decreases, and thus the counter substrate is likely to come close to the main body portion of the inorganic sealing portion. For this reason, it is sufficiently suppressed that the thickness of the adhesive portion of the resin sealing portion decreases, and the deterioration in the adhesive property of the adhesive portion with respect to the counter substrate is sufficiently suppressed. Accordingly, it is sufficiently suppressed that the adhesive portion is peeled off from the counter substrate. Consequently, according to the dye-sensitized solar cell obtained by the manufacturing method of the invention, it is possible to exhibit excellent durability even in a high temperature environment. In addition, unevenness generally occurs in the thickness of the sealing portion of each dye-sensitized solar cell when the temperature or the pressure is not precisely controlled in the bonding step of bonding the working electrode with the counter electrode together. With regard to that point, in the manufacturing method of the invention, the inorganic sealing portion is constituted by the main body portion and the protruding portion extending from the main body portion and thus the counter substrate comes in contact with the protruding portion and the thickness of the sealing portion does not decrease easily even if the temperature is set to be a little high and the pressure is set to be a little high at the time of bonding. For this reason, it is possible to sufficiently suppress the unevenness in the thickness of the sealing portion even without performing the precise control of the temperature or the pressure in the bonding step to bond the conductive substrate with the counter substrate together. For this reason, it is possible to simply perform the bonding step, and thus it is possible to simply obtain a dye-sensitized solar cell exhibiting excellent durability.

In the method of manufacturing a dye-sensitized solar cell, it is preferable that a melting point of the protruding portion be higher than a melting point of the adhesive portion.

In the method of manufacturing a dye-sensitized solar cell, it is preferable that the sealing portion be formed such that at least a part of the adhesive portion is provided on a side opposite to the electrolyte with respect to the protruding portion in the bonding step.

In this case, in the dye-sensitized solar cell to be obtained, the degradation of the adhesive portion by the electrolyte is more sufficiently suppressed compared to a case in which the entire adhesive portion is on the electrolyte side with respect to the protruding portion. For this reason, it is possible that the dye-sensitized solar cell to be obtained exhibits more excellent durability. In addition, the sealing portion is formed such that at least a part of the adhesive portion is provided on the side opposite to the electrolyte with respect to the protruding portion in the bonding step, and thus it is more sufficiently suppressed that the resin material contained in the adhesive portion is fluidized, covers the porous oxide semiconductor layer, and thus is impregnated into the porous oxide semiconductor layer compared to a case in which the entire adhesive portion is on the electrolyte side with respect to the protruding portion. As a result, the electrolyte is more sufficiently impregnated into the porous oxide semiconductor layer, and thus it is possible that the dye-sensitized solar cell to be obtained exhibits more excellent photoelectric conversion characteristics.

In the method of manufacturing a dye-sensitized solar cell, it is preferable that the inorganic sealing portion be formed such that a height of the protruding portion from the main body portion is from 20 to 100 μm in the inorganic sealing portion forming step.

In this case, it is possible to hold the minimum thickness of the adhesive portion at from 20 to 100 μm even when the dye-sensitized solar cell to be obtained is placed in a high temperature environment and thus the adhesive portion included in the resin sealing portion softens. For this reason, it is possible to more sufficiently secure the adhesive property of the adhesive portion with respect to the counter substrate compared to a case in which the height of the protruding portion is less than 20 μm. In addition, thinning of the dye-sensitized solar cell is possible since the distance between the substrates is narrower compared to a case in which the height of the protruding portion exceeds 100 μm.

The method of manufacturing a dye-sensitized solar cell may include a first electrode preparing step of preparing a first electrode having the conductive substrate, and the counter substrate may be constituted by a second electrode.

Effect of the Invention

According to the invention, a dye-sensitized solar cell exhibiting excellent durability even in a high temperature environment and a method of manufacturing the same are provided.

BRIEF DESCRIPTION OF DRAWINGS

FIG. 3 is a cross-sectional view illustrating a first electrode preparing step of a method of manufacturing a dye-sensitized solar cell of FIG. 1;

FIG. 4A is a cross-sectional view illustrating a part of an inorganic sealing portion forming step of a method of manufacturing a dye-sensitized solar cell of FIG. 1;

FIG. 4B is a cross-sectional view illustrating a part of an inorganic sealing portion forming step of a method of manufacturing a dye-sensitized solar cell of FIG. 1;

FIG. 5 is a cross-sectional view illustrating a second electrode preparing step of a method of manufacturing a dye-sensitized solar cell of FIG. 1;

FIG. 6 is a cross-sectional view illustrating a first sealing material fixing step of a method of manufacturing a dye-sensitized solar cell of FIG. 1;

FIG. 7 is a cross-sectional view illustrating a second sealing material fixing step of a method of manufacturing a dye-sensitized solar cell of FIG. 1;

FIG. 8 is a cross-sectional view illustrating an electrolyte disposing step of a method of manufacturing a dye-sensitized solar cell of FIG. 1;

FIG. 9 is a cross-sectional view illustrating a bonding step of a method of manufacturing a dye-sensitized solar cell of FIG. 1;

MODE(S) FOR CARRYING OUT THE INVENTION

Figure 1:
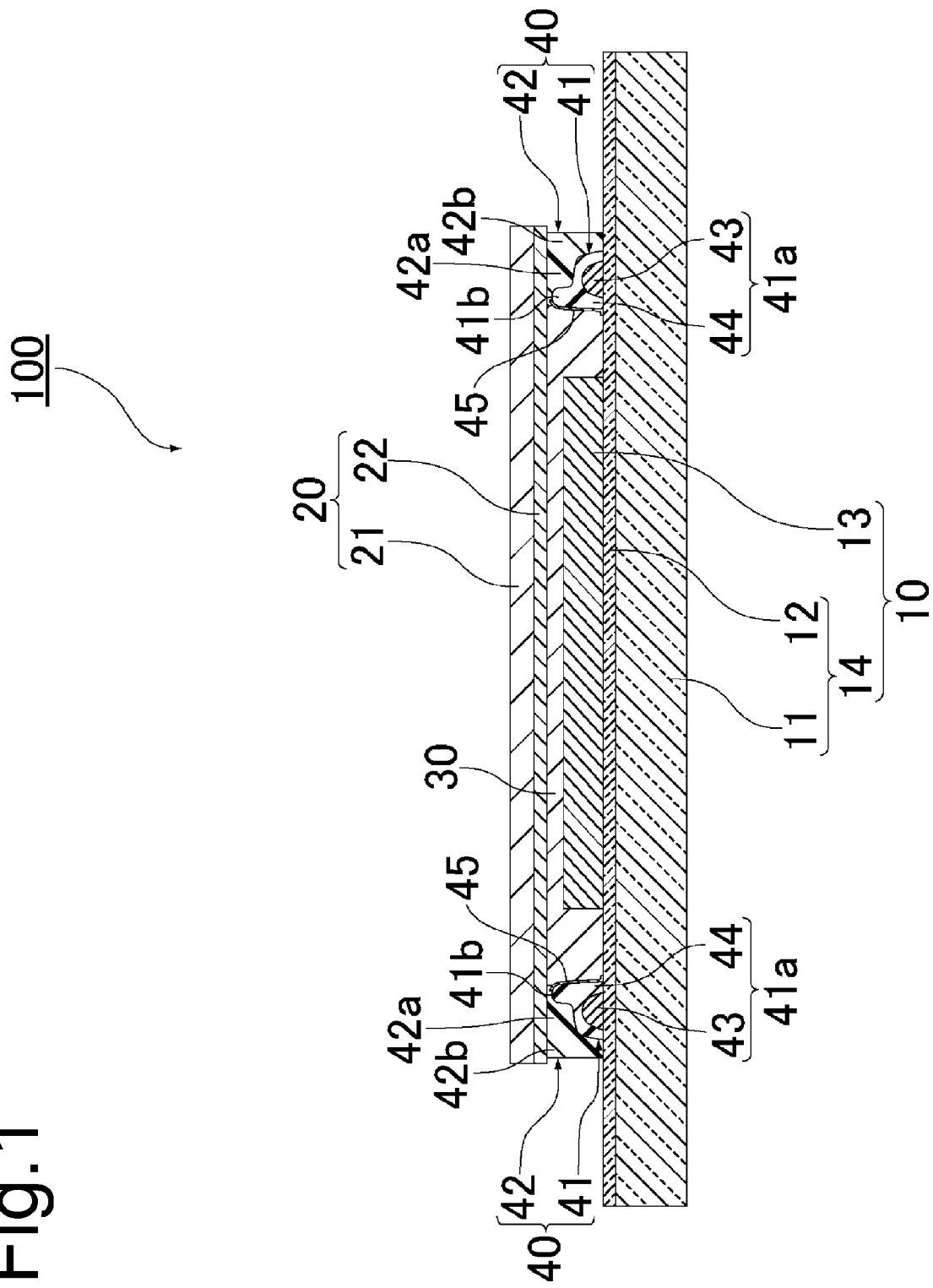
FIG. 1 is a cross-sectional view illustrating a first embodiment of a dye-sensitized solar cell of the invention.

Hereinafter, embodiments of the invention will be described in detail with reference to the accompanying drawings. Meanwhile, the same reference numerals are given to the same or equivalent components in all of the figures, and redundant description is omitted.

First Embodiment

Figure 2:
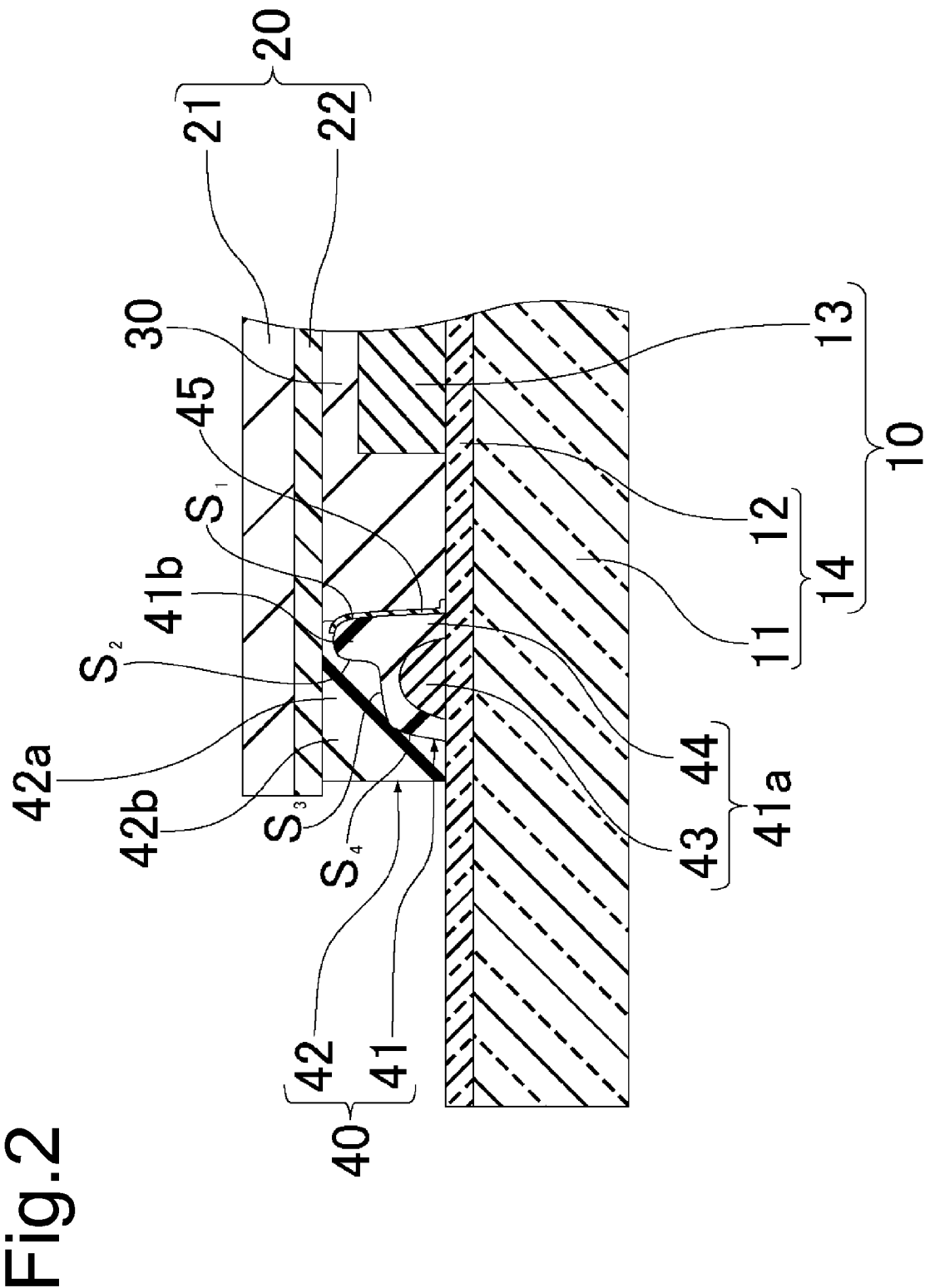
FIG. 2 is an enlarged partial cross-sectional view of FIG. 1.

In the first place, the first embodiment of the dye-sensitized solar cell of the invention will be described in detail with reference to the accompanying drawings. FIG. 1 is a cross-sectional view illustrating the first embodiment of the dye-sensitized solar cell according to the invention and FIG. 2 is an enlarged partial cross-sectional view of FIG. 1.

As illustrated in FIG. 1, a dye-sensitized solar cell 100 is equipped with a working electrode (first electrode) 10, a counter electrode 20 (second electrode) disposed to face the working electrode 10, an electrolyte 30 disposed between the working electrode 10 and the counter electrode 20, and an annular sealing portion 40 surrounding the electrolyte 30 together with the working electrode 10 and the counter electrode 20. In addition, the internal pressure of the cell space surrounded by the working electrode 10, the counter electrode 20, and the sealing portion 40 is less than the atmospheric pressure.

The working electrode 10 is equipped with a transparent conductive substrate 14 having the electrolyte 30 in the space between the working electrode 10 and the counter electrode 20 and a porous oxide semiconductor layer 13 bonded to the surface of the conductive substrate 14. The conductive substrate 14 is constituted by a transparent substrate 11 and a transparent conductive film 12 (hereinafter, referred to as the "transparent conductive layer") which is provided on the counter electrode 20 side of the transparent substrate 11 and is bonded to the porous oxide semiconductor layer 13. A photosensitizing dye is supported on the porous oxide semiconductor layer 13.

The counter electrode 20 faces the conductive substrate 14 and is constituted by a counter electrode substrate 21 and a catalyst layer 22 provided on the surface of the electrolyte 30 side of the counter electrode substrate 21.

As illustrated in FIG. 2, the annular sealing portion 40 has an inorganic sealing portion 41 which is composed of an inorganic material and has a continuous and annular shape, a resin sealing portion 42 which is composed of a resin material and has a continuous and annular shape, and a thermosetting resin 45 which covers the inner circumferential surface $S_1$ of the inorganic sealing portion 41 and thus protects the inorganic sealing portion 41 from the electrolyte 30.

The annular inorganic sealing portion 41 has a main body portion 41a which is provided on the transparent conductive substrate 14 of the working electrode 10 and has a continuous and annular shape and a protruding portion 41b which extends from a part of the main body portion 41a toward the side opposite to the conductive substrate 14 and has a continuous and annular shape. The main body portion 41a is constituted by a current collecting wiring 43 provided on the transparent conductive layer 12 and a wiring protective portion 44 to cover and thus protect the current collecting wiring 43 from the electrolyte 30. The protruding portion 41b extends from the region near the electrolyte 30 of a region $S_3$ on the side opposite to the conductive substrate 14 of the main body portion 41a toward the side opposite to the conductive substrate 14, namely the counter electrode 20 side.

On the other hand, the resin sealing portion 42 is constituted by an adhesive portion 42a adhering the inorganic sealing portion 41 to the counter electrode 20 and an expanding portion 42b which expands on the side opposite to the protruding portion 41b with respect to the adhesive portion 42a and is adhered to a region $S_4$, in which the adhesive portion 42a is not adhered, of the main body portion 41a of the inorganic sealing portion 41. Here, a part of the adhesive portion 42a is adhered to an outer circumferential surface $S_2$ which is provided on the side opposite to the electrolyte 30 with respect to the protruding portion 41b and is positioned along the extending direction of the protruding portion 41b. The remainder of the adhesive portion 42a is penetrated into between the protruding portion 41b and the counter electrode 20 and is adhered to the protruding portion 41b and the counter electrode 20. In addition, the expanding portion 42b connects the transparent conductive layer 12 of the working electrode 10 with the counter electrode 20.

According to this dye-sensitized solar cell 100, the adhesive portion 42a included in the resin sealing portion 42 softens when the dye-sensitized solar cell 100 is placed in a high temperature environment. At this time, in the dye-sensitized solar cell 100, the inorganic sealing portion 41 has a protruding portion 41b extending from the main body portion 41a to the side opposite to the conductive substrate 14. Here, the main body portion 41a and the protruding portion 41b can be maintained in a rigid state even if the adhesive portion 42a included in the resin sealing portion 42 softens since the main body portion 41a and the protruding portion 41b included in the inorganic sealing portion 41 are composed of an inorganic material. Hence, when the adhesive portion 42a included in the resin sealing portion 42 softens, the thickness of the adhesive portion 42a decreases, and thus the counter electrode 20 is likely to come close to the main body portion 41a of the inorganic sealing portion 41, the counter electrode 20 comes in contact with the protruding portion 41b in the meantime, and thus it is prevented that the counter electrode 20 comes closer to the main body portion 41a after that. For this reason, it is sufficiently suppressed that the thickness of the adhesive portion 42a of the resin sealing portion 42 decreases, and the deterioration in the adhesive property of the adhesive portion 42a with respect to the counter electrode 20 is sufficiently suppressed. Accordingly, it is sufficiently suppressed that the adhesive portion 42a is peeled off from the counter electrode 20. Consequently, according to the dye-sensitized solar cell 100, it is possible to exhibit excellent durability even in a high temperature environment.

In addition, in the dye-sensitized solar cell 100, a part of the adhesive portion 42a is provided on the side opposite to the electrolyte 30 with respect to the protruding portion 41b. For this reason, the degradation of the adhesive portion 42a by the electrolyte 30 is more sufficiently suppressed compared to a case in which the entire adhesive portion 42a is on the electrolyte 30 side with respect to the protruding portion 41b. For this reason, it is possible that the dye-sensitized solar cell 100 exhibits more excellent durability.

In addition, in the dye-sensitized solar cell 100, the remainder of the adhesive portion 42a is penetrated into between the protruding portion 41b and the counter electrode 20 and is adhered to the protruding portion 41b and the counter electrode 20. For this reason, it is possible to increase the adhesion area of the resin sealing portion 42 with the counter electrode 20 compared to a case in which the remainder of the adhesive portion 42a does not penetrate into between the protruding portion 41b and the counter electrode 20. For this reason, the adhesive property of the resin sealing portion 42 with respect to the counter electrode 20 is more improved and the resin sealing portion 42 more does not peel off from the counter electrode 20 easily. As a result, it is possible that the dye-sensitized solar cell 100 exhibits more excellent durability.

In addition, in the dye-sensitized solar cell 100, the resin sealing portion 42 further has an expanding portion 42b adhering to the region $S_4$, in which the adhesive portion 42a is not adhered, of the main body portion 41a of the inorganic sealing portion 41. For this reason, the resin sealing portion 42 is adhered by the expanding portion 42b to the region $S_4$, in which the adhesive portion 42a is not adhered, of the main body portion 41a of the inorganic sealing portion 41 in addition to being adhered to the main body portion 41a of the inorganic sealing portion 41 by the adhesive portion 42a. For this reason, the adhesive portion 42a is reinforced when the resin sealing portion 42 has the expanding portion 42b compared to the case of not having the expanding portion 42b. In other words, the adhesive portion 42a does not peel off from the counter electrode 20 easily even when an excessive stress is applied to the adhesive portion 42a since the adhesive portion 42a is reinforced by the expanding portion 42b. Consequently, it is possible that the dye-sensitized solar cell 100 exhibits more excellent durability. Particularly in the present embodiment, the expanding portion 42b connects the conductive substrate 14 with the counter electrode 20. For this reason, the reinforcing effect with respect to the adhesive portion 42a further increases. In addition, peeling of the sealing portion 40 with respect to the counter electrode 20 or the working electrode 10 is sufficiently suppressed even if an excessive stress is applied along the interface between the sealing portion 40 and the counter electrode 20 or the interface between the sealing portion 40 and the working electrode 10. As a result, it is possible to further improve the durability of the dye-sensitized solar cell 100.

Next, the working electrode 10, the photosensitizing dye, the counter electrode 20, the electrolyte 30, the sealing portion 40 and the thermosetting resin 45 will be described in detail.

(Working Electrode)

As described above, the working electrode 10 is equipped with the conductive substrate 14 and the porous oxide semiconductor layer 13 provided on the surface of the 14 conductive substrate, and the conductive substrate 14 is constituted by the transparent substrate 11 and the transparent conductive layer 12 provided on the counter electrode 20 side of the transparent substrate 11.

The material constituting the transparent substrate 11 may be, for example, any transparent material, and examples of such a transparent material may include glass such as borosilicate glass, soda lime glass, glass which is made of soda lime and whose iron component is less than that of ordinary soda lime glass, and quartz glass, and a resin film such as polyethylene terephthalate (PET), polyethylene naphthalate (PEN), polycarbonate (PC), and polyethersulfone (PES). The thickness of the transparent substrate 11 is appropriately determined depending on the size of the dye-sensitized solar cell 100 and is not particularly limited, but, for example, the thickness may be set in the range of from 50 to 10000 µm.

Examples of the material constituting the transparent conductive layer 12 may include a conductive metal oxide such as tin-doped indium oxide (ITO), tin oxide ($SnO_2$), and fluorine-doped tin oxide (FTO). The transparent conductive layer 12 may be constituted by a single layer or a laminate consisting of a plurality of layers constituted by different conductive metal oxides. In a case in which the transparent conductive layer 12 is constituted by a single layer, it is preferable that the transparent conductive layer 12 be constituted by FTO since FTO has high heat resistance and chemical resistance. The thickness of the transparent conductive layer 12 may be set in the range of from 0.01 to 2 µm, for example.

The porous oxide semiconductor layer 13 is constituted by oxide semiconductor particles. Examples of the oxide semiconductor particles may include titanium oxide ($TiO_2$), zinc oxide, (ZnO), tungsten oxide ($WO_5$), niobium oxide ($Nb_2O_5$), strontium titanate ($SrTiO_5$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), and aluminum oxide ($Al_2O_3$), or oxide semiconductor particles constituted by two or more kinds of these. It is preferable that the average particle size of these oxide semiconductor particles be from 1 to 1000 nm since the surface area of the oxide semiconductor covered with a dye increases and thus more electrons can be generated. The thickness of the porous oxide semiconductor layer 13 may be set to from 0.5 to 50 µm, for example. Meanwhile, it is also possible to constitute the porous oxide semiconductor layer 13 by a laminate consisting of a plurality of semiconductor layers composed of different materials.

(Photosensitizing Dye)

Examples of the photosensitizing dye may include ruthenium complex having a ligand containing a bipyridine structure and a terpyridine structure or an organic dye such as porphyrin, eosin, rhodamine, and merocyanine.

(Counter Electrode)

As described above, the counter electrode 20 is constituted by the counter electrode substrate 21 and the catalyst layer 22 provided on the surface of the electrolyte 30 side of the counter electrode substrate 21.

The counter electrode substrate 21 is constituted by, for example, a corrosion-resistant metallic material such as titanium, nickel, platinum, molybdenum, tungsten, and SUS or a substrate obtained by forming a film composed of a conductive oxide such as ITO and FTO on the transparent substrate 11 described above. The thickness of the counter electrode substrate 21 is appropriately determined depending on the size of the dye-sensitized solar cell 100 and is not particularly limited, but the thickness may be set to from 0.005 to 0.1 mm, for example.

The catalyst layer 22 is constituted by platinum, a carbon-based material, a conductive polymer or the like. Here, examples of the carbon-based material may include carbon black, ketjen black, carbon nanotubes, and carbon nanotubes are particularly suitably used among them.

The counter electrode 20 may or may not exhibit flexibility, but it is preferable that the counter electrode 20 exhibit flexibility. In this case, it is possible for the cell space to expand even in a case in which the internal pressure of the cell space is increased and thus it is possible to reduce the stress applied to the interface between the counter electrode 20 and the sealing portion 40. For this reason, it is possible that the dye-sensitized solar cell 100 is more excellent in durability.

Meanwhile, in the present specification, the electrode "exhibiting flexibility" refers to an electrode in which the maximum deformation rate of the flexure of the electrode exceeds 20% when the both edges (width of 5 mm, respectively) of the long side of the sheet-shaped electrode of 50 mm×200 mm are fixed horizontally at a tension of 1 N and a load of 20 g weight is applied to the center of the electrode in an environment of 20° C. Here, the maximum deformation rate refers to the value calculated based on the following Equation:

Maximum deformation rate (%)=100×(maximum displacement quantity/thickness of sheet-shaped electrode).

Hence, for example, in a case in which the flexure occurs and the maximum displacement quantity of 0.01 mm is obtained by applying a load to a sheet-shaped electrode having a thickness of 0.04 mm as described above, the maximum deformation rate is 25%, and thus this sheet-shaped electrode is regarded as "exhibiting flexibility".

(Electrolyte)

The electrolyte 30 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 30 may use an ionic liquid instead of the organic solvent. As the ionic liquid, it is possible to use, for example, an ordinary temperature molten salt which is a known iodine salt such as a pyridinium salt, an imidazolium salt, and a triazolium salt and is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 30 may use a mixture of the ionic liquid above and the organic solvent above instead of the organic solvent above.

In addition, it is possible to add an additive to the electrolyte 30. Examples of the additive may include LiI, $I_2$, 4-t-butylpyridine, guanidinium thiocyanate, 1-methylbenzimidazole, and 1-butylbenzimidazole.

Moreover, as the electrolyte 30, a nanocomposite gel electrolyte of a quasi-solid electrolyte which has a gel-like form and is obtained by mixing and kneading the nanoparticles such as $SiO_2$, $TiO_2$, and carbon nanotubes with the electrolyte above may be used, or an electrolyte gelled using an organic gelling agent such as polyvinylidene fluoride, a polyethylene oxide derivative, and an amino acid derivative may also be used.

(Sealing Portion)

As described above, the sealing portion 40 is constituted by the inorganic sealing portion 41 and the resin sealing portion 42.

As described above, the inorganic sealing portion 41 is constituted by the main body portion 41a and the protruding portion 41b.

In the present embodiment, the main body portion 41a is constituted by the current collecting wiring 43 and the wiring protective portion 44. The current collecting wiring 43 may be constituted by a material exhibiting lower electrical resistance than the transparent conductive layer 12 and is constituted by silver, for example.

The wiring protective portion 44 may be constituted by a material capable of protecting the current collecting wiring 43 from the electrolyte 30, and is composed of, for example, an inorganic insulating material such as a non-lead-based transparent glass frit having a low melting point. As the low melting point glass frit, it is possible to use one having a softening point of from 150 to 550° C.

It is preferable that the protruding portion 41b have a melting point (T2) higher than the melting point (T1) of the adhesive portion 42a. In this case, the (T2−T1) may be greater than 0° C. and is not particularly limited, but the (T2−T1) is preferably from 50 to 700° C. and more preferably from 300 to 500° C.

The protruding portion 41b is composed of, for example, an inorganic insulating material such as a non-lead-based transparent glass frit having a low melting point.

The height H (see FIG. 4B) of the protruding portion 41b from the main body portion 41a is not particularly limited but is usually from 20 to 300 µm.

It is preferable that the height H of the protruding portion 41b from the main body portion 41a be from 20 to 100 µm. In this case, it is possible to hold the minimum thickness of the adhesive portion 42a at from 20 to 100 µm even when the dye-sensitized solar cell 100 is placed in a high temperature environment and thus the adhesive portions 42a included in the resin sealing portion 42 softens. For this reason, it is possible to more sufficiently secure the adhesive property of the adhesive portion 42a with respect to the counter electrode 20 compared to a case in which the height H of the protruding portion 41b is less than 20 µm. In addition, the interval between the working electrode 10 and counter electrode 20 is narrower compared to a case in which the height H of the protruding portion 41b exceeds 100 µm. Accordingly, thinning of the dye-sensitized solar cell 100 is possible and higher power generation efficiency is obtained as well.

The height H of the protruding portion 41b from the main body portion 41a is more preferably from 40 to 80 µm.

The width of the protruding portion 41b is preferably from 10 to 1000 µm and more preferably from 50 to 500 µm. It is possible to sufficiently secure the width of the adhesive portion 42a between the protruding portion 41b and the counter electrode 20, the protruding portion 41b can more sufficiently play the role as a spacer, and it is also possible to more increase the power generation area of the dye-sensitized solar cell 100 when the width of the protruding portion 41b is in the above range compared to a case in which the width is out of the above range. Here, the width of the protruding portion 41b refers to the maximum width of the protruding portion 41b when the protruding portion 41b is viewed from a direction perpendicular to the surface of the conductive substrate 14.

The resin sealing portion 42 is composed of a resin material. Examples of the resin material may include various kinds of modified polyolefin resins including an ionomer, an ethylene-vinyl acetic anhydride copolymer, an ethylene-methacrylic acid copolymer, an ethylene-vinyl alcohol copolymer and the like, an ultraviolet cured resin, and vinyl alcohol polymer.

(Thermosetting Resin)

The thermosetting resin 45 may be any one which is able to cover the protruding portion 41b and the wiring protective portion 44 and thus to protect them from the electrolyte 30, and specific examples of the thermosetting resin 45 may include a polyimide resin, an acrylic resin, a polyester resin, and an epoxy resin.

Next, the method of manufacturing the dye-sensitized solar cell 100 will be described with reference to FIGS. 3 to 9.

FIGS. 3 to 9 are cross-sectional views illustrating a series of processes for manufacturing the dye-sensitized solar cell 100.

[First Electrode Preparing Step]

First, the working electrode 10 is prepared as follows (see FIG. 3).

At the beginning, the transparent conductive substrate 14 is fabricated by forming one sheet of continuous transparent conductive layer 12 on the transparent substrate 11. As the method of forming the transparent conductive layer 12, a sputtering method, a vapor deposition method, a spray pyrolysis deposition method (SPD), a CVD method or the like is used.

Next, a paste for porous oxide semiconductor layer formation is printed in the region, in which porous oxide semiconductor layer 13 would be formed, on the surface of the transparent conductive layer 12 of conductive substrate 14. The paste for porous oxide semiconductor layer formation contains a resin such as polyethylene glycol and a solvent such as terpineol in addition to the oxide semiconductor particles described previously. It is possible to use, for example, a screen printing method, a doctor blade method, and a bar coating method as the printing method of the paste for porous oxide semiconductor layer formation.

Next, the paste for porous oxide semiconductor layer formation is fired to form the porous oxide semiconductor layer 13, thereby obtaining the working electrode 10.

The firing temperature varies depending on the oxide semiconductor particles but is usually from 350 to 600° C., and the firing time also varies depending on the oxide semiconductor particles but is usually from 1 to 5 hours.

[Inorganic Sealing Portion Forming Process]

Next, as illustrated in FIG. 4A, the main body portion 41a having a continuous and annular shape is formed so as to surround the porous oxide semiconductor layer 13. It is possible to obtain the main body portion 41a by forming the current collecting wiring 43 so as to surround the porous oxide semiconductor layer 13 and subsequently forming the wiring protective portion 44 so as to cover the current collecting wiring 43.

The current collecting wiring 43 can be obtained, for example, by blending metal particles with a thickening agent such as polyethylene glycol to form a paste, coating the paste into a film so as to surround the porous oxide semiconductor layer 13 using, for example, a screen printing method, and heating to fire. The wiring protective portion 44 can be obtained, for example, by coating a paste for wiring protective layer formation prepared by blending an inorganic insulating material such as a low melting point glass frit with a thickening agent, a binding agent, a dispersing agent, a solvent, and the like if necessary so as to cover the entire current collecting wiring 43 by, for example, a screen printing method and heating to fire.

Next, as illustrated in FIG. 4B, the protruding portion 41b having a continuous and annular shape is formed on the main body portion 41a. At this time, the protruding portion 41b is formed at the position near the porous oxide semiconductor layer 13 of the surface $S_3$ on the side opposite to the conductive substrate 14 of the main body portion 41a. The protruding portion 41b can be obtained, for example, by coating a paste for protruding portion formation containing a low melting point glass frit on the position near the porous oxide semiconductor layer 13 of the surface $S_3$ on the side opposite to the conductive substrate 14 of the main body portion 41a by, for example, a screen printing method and heating to fire. Meanwhile, it is possible to use, for example, the same paste as the paste for wiring protective layer formation described above as the paste for protruding portion formation.

Next, the inner circumferential surface of the annular protruding portion 41b is covered with the thermosetting resin 45. The thermosetting resin 45 can be obtained by, for example, a screen printing method and a dispense method (see FIG. 2).

[Dye Supporting Step]

Next, a photosensitizing dye is supported on the porous oxide semiconductor layer 13 of the working electrode 10. For this, a photosensitizing dye may be adsorbed on the porous oxide semiconductor layer 13 by immersing the working electrode 10 in a solution containing the photosensitizing dye, or a photosensitizing dye may be adsorbed on the porous oxide semiconductor layer 13 by coating a solution containing the photosensitizer dye on the porous oxide semiconductor layer 13 and then drying.

[Counter Substrate Preparing Step]

On the other hand, the counter electrode 20 as a counter substrate is prepared as follows.

In other words, as illustrated in FIG. 5, the counter electrode substrate 21 is prepared. Thereafter, the catalyst layer 22 is formed on the counter electrode substrate 21. A sputtering method, a vapor deposition method or the like is used as the method of forming the catalyst layer 22. The sputtering method is preferable in terms of the uniformity of the film among these.

[First Sealing Material Fixing Step]

Next, as illustrated in FIG. 6, a first sealing material 42A having a continuous and annular shape is fixed on the inorganic sealing portion 41 fixed to the working electrode 10. The first sealing material 42A can be fixed to the inorganic sealing portion 41, for example, by heating a thermoplastic resin to melt and adhering the thermoplastic resin to the inorganic sealing portion 41. Specifically, the first sealing material 42A is disposed so as to also cover the outer circumferential surface $S_2$ along the extending direction of the protruding portion 41b as well as to cover a region $S_5$ on the outer side more than the main body portion 41a of the surface of the conductive substrate 14 and the entire surfaces $S_3$ and $S_4$ on the side opposite to the electrolyte 30 with respect to the protruding portion 41b of the main body portion 41a, and then is melted by heating to be adhered to the inorganic sealing portion 41, thereby fixing to the inorganic sealing portion 41. At this time, it is preferable that the melting point of the first sealing material 42A be lower than the melting point (T2) of the protruding portion 41b.

[Second Sealing Material Fixing Step]

Next, as illustrated in FIG. 7, the second sealing material 42B is fixed to the annular part B2 on the surface of the catalyst layer 22 of the counter electrode 20. The second sealing material 42B can be foxed, for example, by heating a thermoplastic resin to melt and adhering to the catalyst layer 22. It is possible to use the same material as the first sealing material 42A as the second sealing material 42B. It is preferable that the melting point of the second sealing material 42B be lower than the melting point (T2) of the protruding portion 41b.

[Electrolyte Disposing Step]

Subsequently, as illustrated in FIG. 8, the electrolyte 30 is disposed on the working electrode 10 and on the inner side of the inorganic sealing portion 41. The electrolyte 30 can be obtained by injecting or printing the electrolyte 30 on the working electrode 10 and on the inner side of the inorganic sealing portion 41 so as to cover the porous oxide semiconductor layer 13.

[Bonding Step]

Next, as illustrated in FIG. 9, the working electrode 10 and the counter electrode 20 are bonded together, for example, under reduced pressure. In this manner, the sealing portion 40 is formed between the working electrode 10 and the counter electrode 20 (see FIG. 1).

At this time, the part at which the first sealing material 42A and the second sealing material 42B are overlapped each other is heated while locally applying a pressure, and thus the first sealing material 42A and the second sealing material 42B are hot melted. In this manner, the resin sealing portion 42 is formed by the first sealing material 42A and the second sealing material 42B, thereby forming the sealing portion 40 (see FIG. 1).

At this time, the pressurization of the first sealing material 42A and the second sealing material 42B is usually performed at from 1 to 50 MPa, preferably from 2 to 30 MPa, and more preferably from 3 to 20 MPa.

In addition, the temperature at the time of melting the first sealing material 42A and the second sealing material 42B may be equal to or higher than the melting point of the thermoplastic resin forming the first sealing material 42A and the second sealing material 42B. The thermoplastic resin forming the first sealing material 42A and the second sealing material 42B does not melt when the above temperature is below the melting point of the thermoplastic resin, and thus it is not possible to form the sealing portion 40 by adhering the first sealing material 42A to the second sealing material 42B. Meanwhile, the melting point of the thermoplastic resin refers to the melting point of the thermoplastic resin having a higher melting point in a case in which the thermoplastic resins forming the first sealing material 42A and the second sealing material 42B are different from each other.

However, it is preferable that the temperature at the time of melting the first sealing material 42A and the second sealing material 42B be equal to or less than the (melting point of thermoplastic resin+200° C.). There is a concern that the thermoplastic resin contained in the first sealing material 42A and the second sealing material 42B is decomposed by heat when the above temperature exceeds the (melting point of thermoplastic resin+200° C.)

In this manner, the dye-sensitized solar cell 100 is obtained, and the manufacture of the dye-sensitized solar cell 100 is completed.

According to the above manufacturing method, it is possible to obtain the dye-sensitized solar cell 100 exhibiting excellent durability even in a high temperature environment.

In addition, unevenness generally occurs in the thickness of the sealing portion of each dye-sensitized solar cell when the temperature or the pressure is not precisely controlled in the bonding step of bonding the working electrode with the counter electrode together. With regard to that point, in the above manufacturing method, the inorganic sealing portion 41 is constituted by the main body portion 41a and the protruding portion 41b extending from the main body portion 41a and thus the counter electrode 20 comes in contact with the protruding portion 41b and, after that, the thickness of the sealing portion 40 does not decrease any more even if the temperature is set to be a little high and the pressure is set to be a little high at the time of bonding. For this reason, it is possible to sufficiently suppress the unevenness in the thickness of the sealing portion 40 even without performing the precise control of the temperature or the pressure in the bonding step of bonding the working electrode 10 with the counter electrode 20 together. For this reason, it is possible to simply perform the bonding step, and thus it is possible to simply obtain the dye-sensitized solar cell 100 exhibiting excellent durability.

Moreover, in the above manufacturing method, the degradation of the adhesive portion 42a by the electrolyte 30 is more sufficiently suppressed compared to a case in which the entire adhesive portion 42a is on the electrolyte 30 side with respect to the protruding portion 41b. For this reason, it is possible that the dye-sensitized solar cell 100 to be obtained exhibits more excellent durability. In addition, the sealing portion 40 is formed such that at least a part of the adhesive portion 42a is provided on a side opposite to the electrolyte 30 with respect to the protruding portion 41b in the bonding step, and thus it is more sufficiently suppressed that the resin material contained in the adhesive portion 42a is fluidized, covers the porous oxide semiconductor layer 13, and thus is impregnated into the porous oxide semiconductor layer 13 compared to a case in which the entire adhesive portion 42a is on the electrolyte 30 side with respect to the protruding portion 41b. As a result, the electrolyte 30 is more sufficiently impregnated into the porous oxide semiconductor layer 13, and thus it is possible that the dye-sensitized solar cell 100 to be obtained exhibits more excellent photoelectric conversion characteristics.

Meanwhile, the preparation of the counter electrode 20 may be performed before the bonding step of the working electrode 10 with the counter electrode 20 and is not necessarily limited to the case of preparing it after the step of preparing the working electrode 10 as in the above manufacturing method. For example, the preparation of the counter electrode 20 may be performed before the step of preparing the working electrode 10. In addition, the fixation of the second sealing material 42B to the counter electrode 20 may also be performed after the preparation of the counter electrode 20 and before the process of bonding of the working electrode 10 with the counter electrode 20, and is not necessarily limited to the case of performing it after the fixation of the first sealing material 42A to the working electrode 10 as in the above manufacturing method. For example, in the case of preparing the counter electrode 20 before the step of preparing the working electrode 10, the fixation of the second sealing material 42B to the counter electrode 20 may be performed after the preparation of the counter electrode 20 and before the preparation of the working electrode 10 or may be performed after the preparation of the working electrode 10 and before the fixation of the first sealing material 42A to the working electrode 10.

In addition, in the above embodiment, the first sealing material 42A is fixed on the inorganic sealing portion 41 and the second sealing material 42B is fixed on the catalyst layer 22 of the counter electrode 20, but only either of the first sealing material 42A or the second sealing material 42B may be fixed on the inorganic sealing portion 41 or on the catalyst layer 22 of the counter electrode 20. In other words, either of the first sealing material fixing process or the second sealing material fixing process may be omitted.

Second Embodiment

Figure 10:
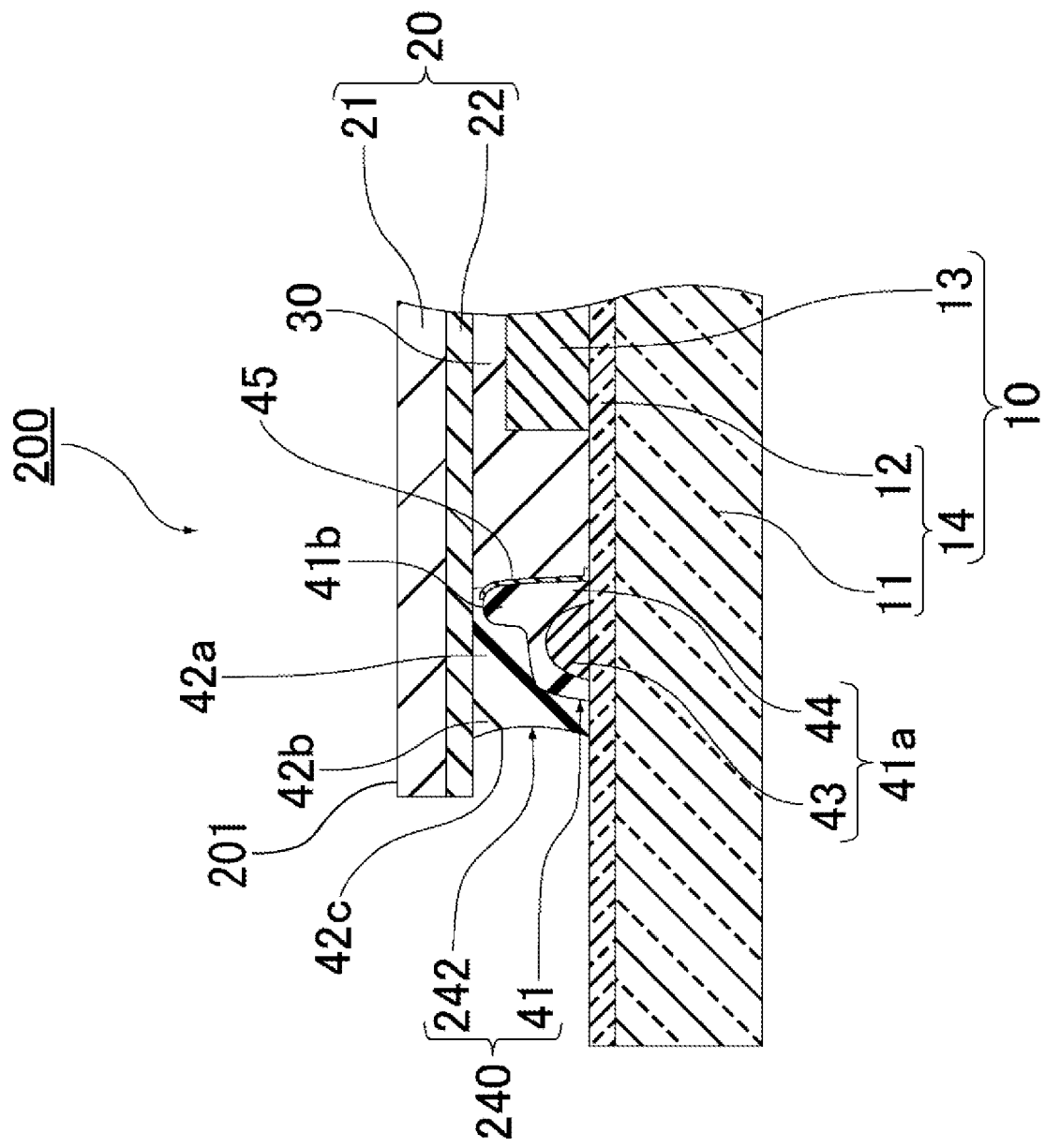
FIG. 10 is a partial cross-sectional view illustrating a second embodiment of a dye-sensitized solar cell of the invention.

Next, a second embodiment of the dye-sensitized solar cell of the invention will be described. FIG. 10 is a partial cross-sectional view illustrating the second embodiment of the dye-sensitized solar cell of the invention.

As illustrated in FIG. 10, a dye-sensitized solar cell 200 of the present embodiment is different from the dye-sensitized solar cell 100 of the first embodiment in that the dye-sensitized solar cell 200 includes a sealing portion 240 having the inorganic sealing portion 41 and a resin sealing portion 242 adhered to the inorganic sealing portion 41 and the outer circumferential surface 42c of the annular resin sealing portion 242 is curved toward inner side, namely the electrolyte 30 side. Here, the material constituting the resin sealing portion 242 is the same as the material constituting the resin sealing portion 42 of the first embodiment.

In this case, the distance between a projecting portion 201 projecting to the outer side more than the protruding portion 41b of the counter electrode 20 and the conductive substrate 14 increases when a stress is applied to the part facing the porous oxide semiconductor layer 13 of the counter electrode 20 and thus the distance between the counter electrode 20 and the porous oxide semiconductor layer 13 decreases. At this time, a great stress is easily applied to the interface between the resin sealing portion 242 and the conductive substrate 14 and the interface between the resin sealing portion 242 and the counter electrode 20. Here, in the dye-sensitized solar cell 200 of the present embodiment, the outer circumferential surface 42c of the annular resin sealing portion 242 is curved toward inner side, namely the electrolyte 30 side. In other words, the outer circumferential surface 42c of the resin sealing portion 242 does not project to form a convex on the side opposite to the electrolyte 30, and a wedge-shaped narrow gap at which the stress is easily concentrated is not formed by the conductive substrate 14 and the outer circumferential surface 42c of the resin sealing portion 242. In addition, a wedge-shaped narrow gap is not formed by the counter electrode 20 and the outer circumferential surface 42c of the resin sealing portion 242 as well. For this reason, it is possible to suppress the concentration of stress at the interface between the resin sealing portion 242 and the conductive substrate 14 and the interface between the resin sealing portion 242 and the counter electrode 20 even if a great stress is applied to these interfaces. Consequently, it is possible that the dye-sensitized solar cell 200 of the present embodiment exhibits excellent durability.

Meanwhile, in order that the outer circumferential surface 42c of the annular resin sealing portion 242 is curved toward inner side, namely the electrolyte 30 side, for example, a structure having a sealing portion between the working electrode 10 and the counter electrode 20 may be obtained by bonding the working electrode 10 with the counter electrode 20 together in a reduced pressure environment and then this structure may be taken out in the atmospheric environment.

Figure 11:
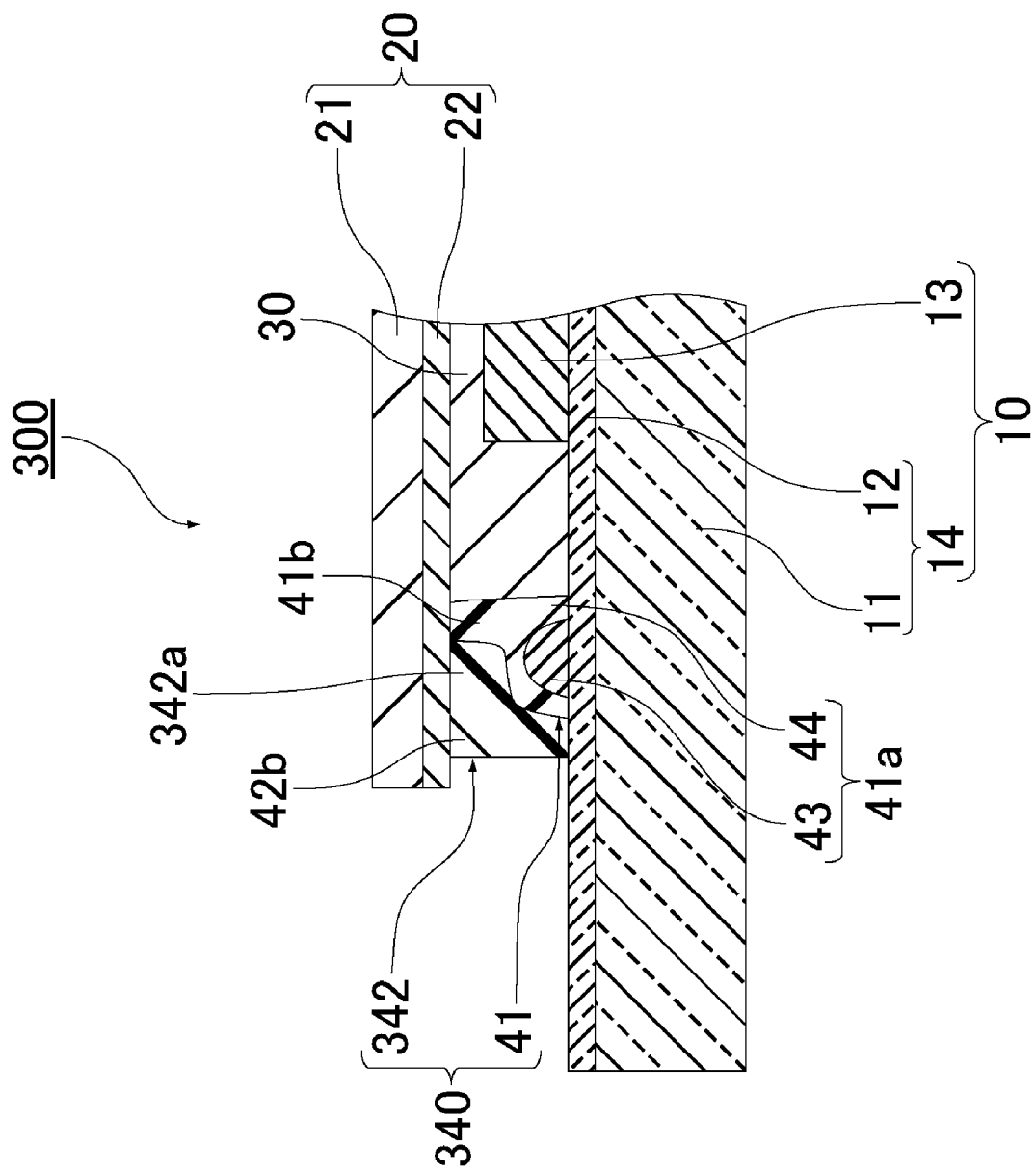
FIG. 11 is a partial cross-sectional view illustrating a third embodiment of a dye-sensitized solar cell of the invention.

The invention is not limited to the above first and second embodiments above. For example, in the first embodiment above, a part of the adhesive portion 42a of the resin sealing portion 42 is penetrated into even between the protruding portion 41b and the counter electrode 20, but it is also acceptable that a sealing portion 340 is constituted by the inorganic sealing portion 41 and a resin sealing portion 342 and a part of an adhesive portion 342a of the resin sealing portion 342 is not penetrated into between the protruding portion 41b and the counter electrode 20 as a dye-sensitized solar cell 300 according to a third embodiment illustrated in FIG. 11. In other words, the protruding portion 41b and the counter electrode 20 may be in direct contact. In this case, the thickness of the adhesive portion 342a is constantly maintained even when the dye-sensitized solar cell 300 is placed in a high temperature environment and thus the resin sealing portion 342 softens and the thickness of the adhesive portion 342a is likely to decrease since the protruding portion 41b and the counter electrode 20 is in direct contact. For this reason, deterioration in the adhesive property of the adhesive portion 342a with respect to the counter electrode 20 is sufficiently suppressed even if the dye-sensitized solar cell 300 is placed in a high temperature environment. Consequently, it is possible that the dye-sensitized solar cell 300 exhibits excellent durability. Meanwhile, the material constituting the resin sealing portion 342 is the same as the material constituting the resin sealing portion 42 of the first embodiment.

Figure 12:
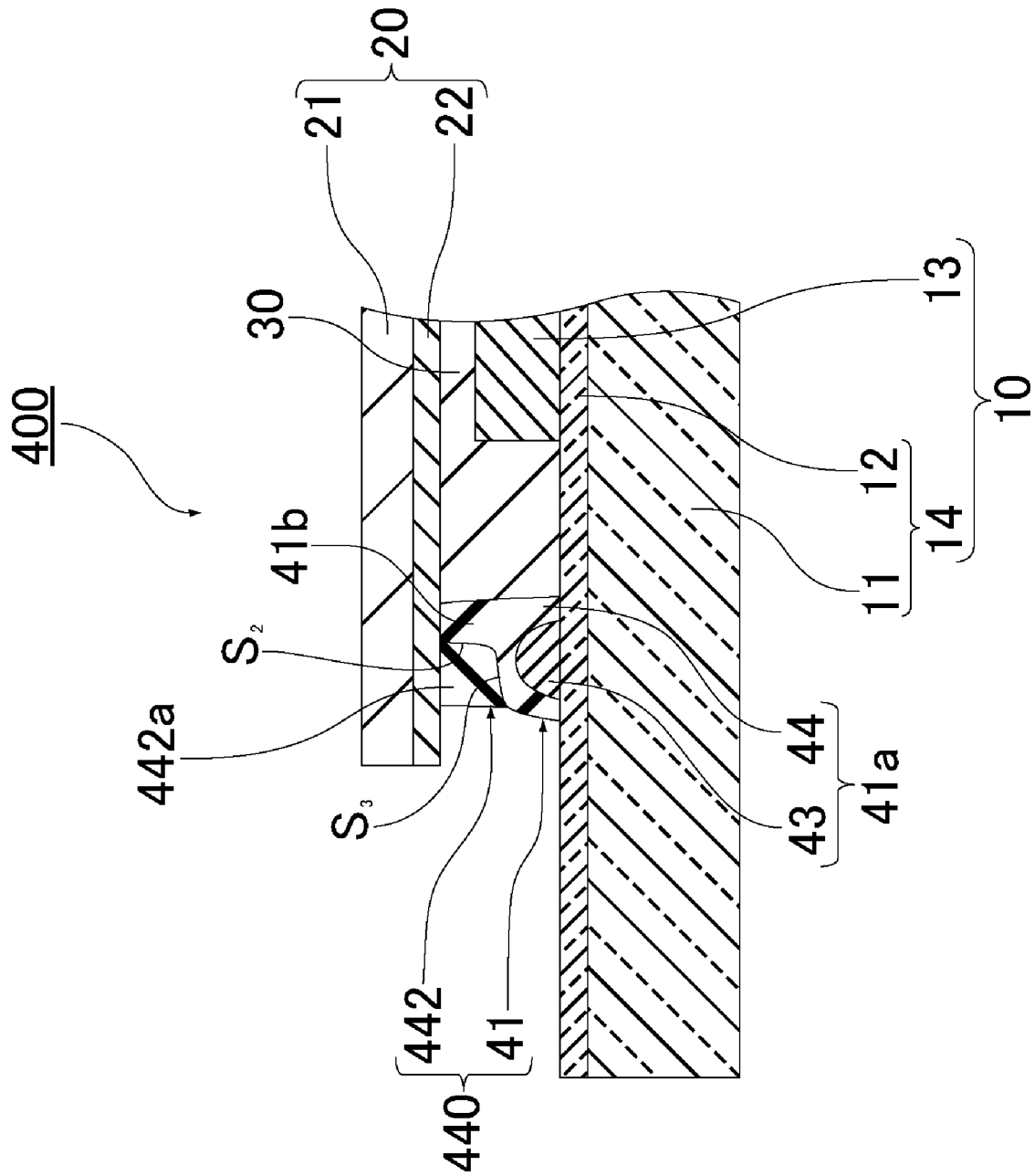
FIG. 12 is a partial cross-sectional view illustrating a fourth embodiment of a dye-sensitized solar cell of the invention.

In addition, in the first embodiment above, the resin sealing portion 42 is constituted by the adhesive portion 42a and the expanding portion 42b, but the expanding portion 42b is not necessarily required and thus can be omitted as the dye-sensitized solar cell 400 according to a fourth embodiment illustrated in FIG. 12. In other words, in a dye-sensitized solar cell 400, a sealing portion 440 is constituted by the inorganic sealing portion 41 and a resin sealing portion 442 and the resin sealing portion 442 may be constituted by only an adhesive portion 442a. Meanwhile, the material constituting the resin sealing portion 442 is the same as the material constituting the resin sealing portion 42 of the first embodiment.

In order to form the resin sealing portion 442 constituted by only the adhesive portion 442a as described above, for example, at the time of fixing the first sealing material 42A to the inorganic sealing portion 41, the first sealing material 42A may be disposed so as to only cover the outer circumferential surface $S_2$ along the extending direction of the protruding portion 41b and the surface $S_3$ on the side opposite to the electrolyte 30 with respect to the protruding portion 41b of the main body portion 41a and the side opposite to the conductive substrate 14 with respect to the main body portion 41a, and then may be melted by heating to be adhered to the inorganic sealing portion 41.

Moreover, in the above first to fourth embodiments above, the protruding portion 41b has a continuous shape, but the protruding portion 41b may have a discontinuous shape. In other words, a plurality of protruding portions 41b may be disposed in an annular shape at a predetermined interval. In this case, the respective protruding portions 41b may have various shapes such as a columnar shape and a spherical shape.

Figure 13:
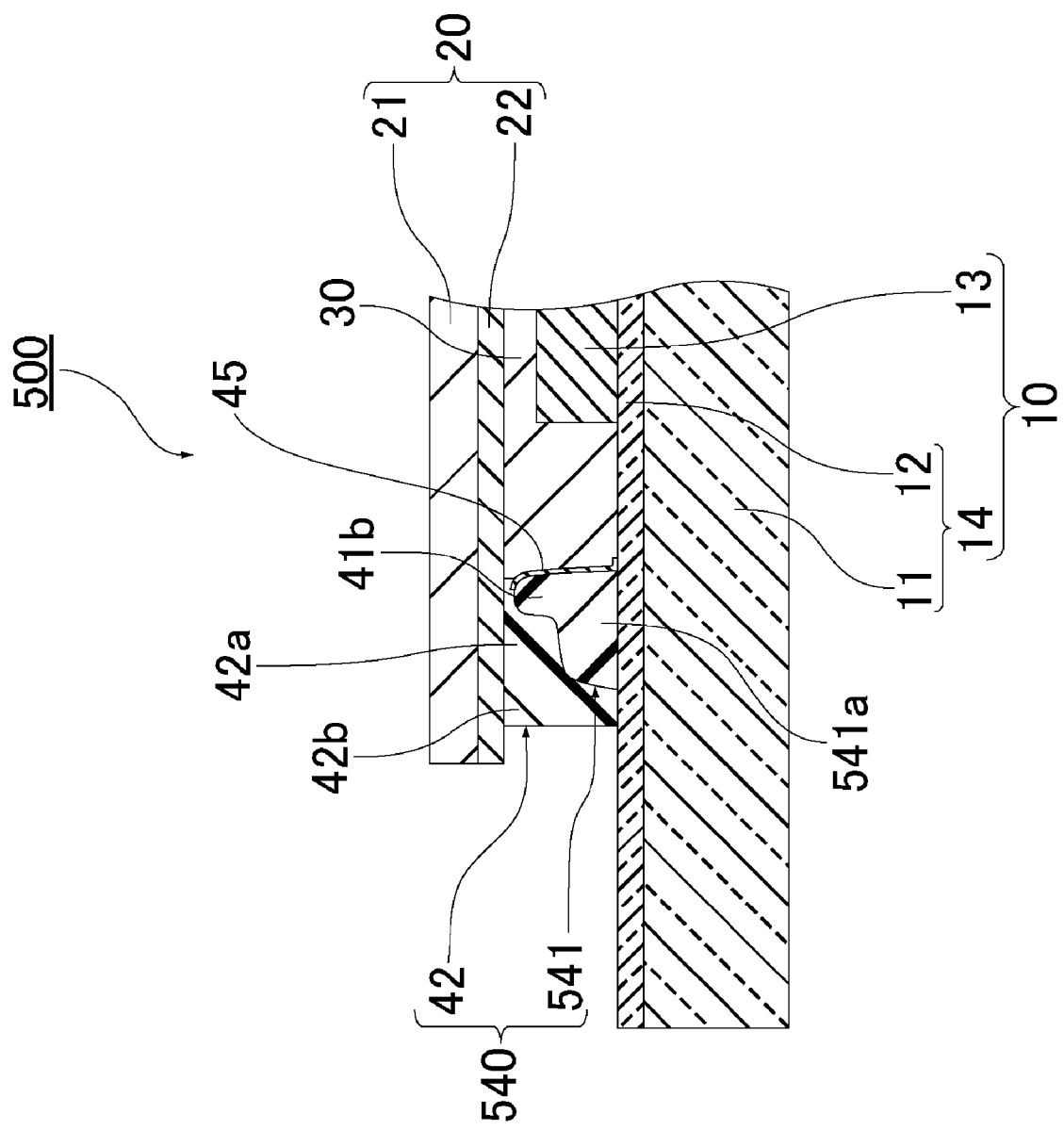
FIG. 13 is a partial cross-sectional view illustrating a fifth embodiment of a dye-sensitized solar cell of the invention.

Moreover, in the first embodiment above, the main body portion 41a is constituted by the current collecting wiring 43 and the wiring protective portion 44, but a sealing portion 540 may be constituted by an inorganic sealing portion 541 and the resin sealing portion 42 and the inorganic sealing portion 541 may be constituted by a main body portion 541a and the protruding portion 41b as a dye-sensitized solar cell 500 according to a fifth embodiment illustrated in FIG. 13. In other words, the main body portion 541a may not include the current collecting wiring 43. Here, the main body portion 541a is constituted by the same material as the wiring protective portion 44.

Figure 14:
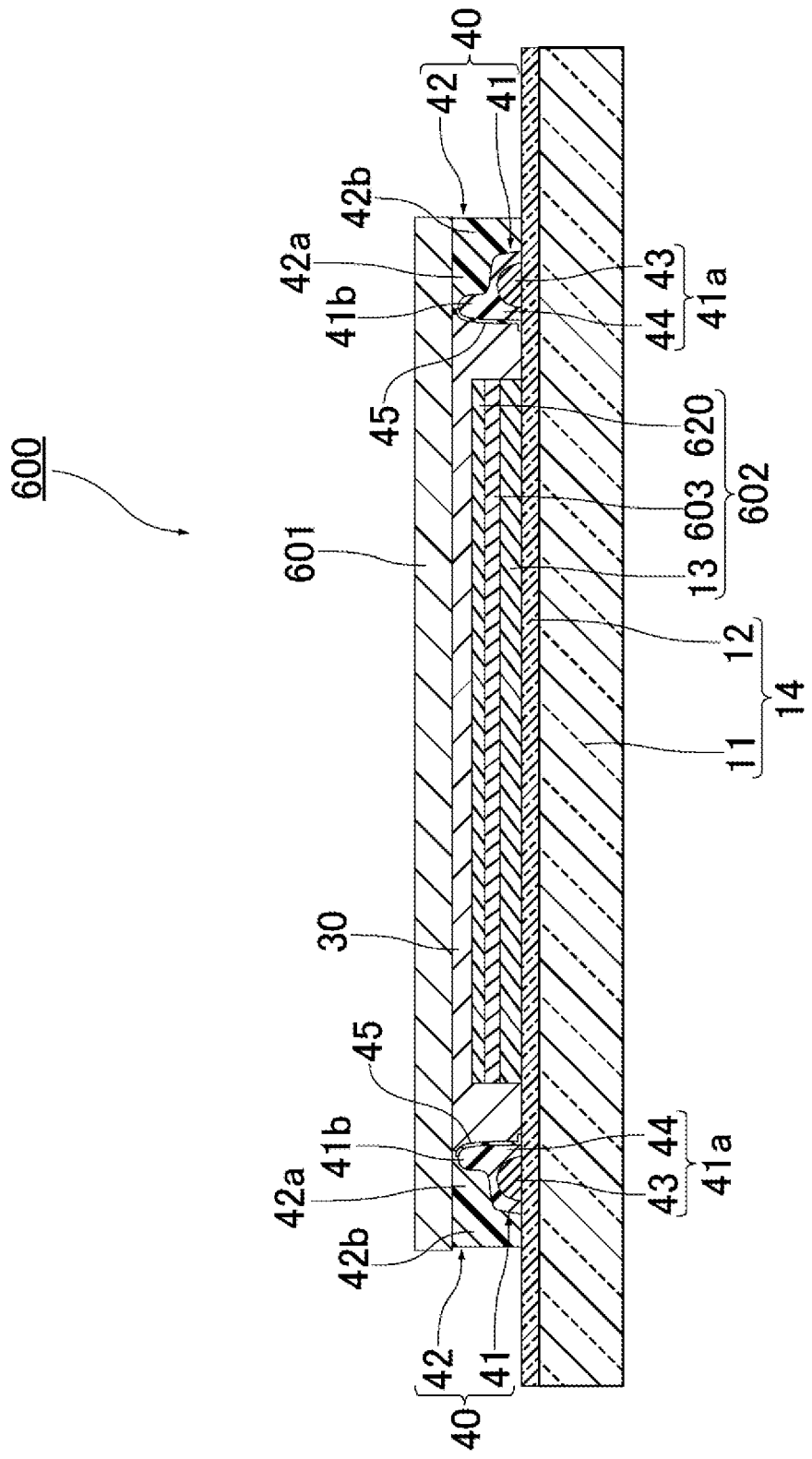
FIG. 14 is a cross-sectional view illustrating a sixth embodiment of a dye-sensitized solar cell of the invention.

Furthermore, in the first to fifth embodiments above, the counter electrode 20 constitutes the counter substrate, but an insulating substrate 601 may be used as the counter substrate instead of the counter electrode 20 as a dye-sensitized solar cell 600 according to a sixth embodiment illustrated in FIG. 14. In this case, a structure 602 is disposed in the space between the insulating substrate 601, the sealing portion 40 and the conductive substrate 14. The structure 602 is provided on the surface of the counter substrate 601 side of the conductive substrate 14. The structure 602 is constituted by the porous oxide semiconductor layer 13, a porous insulating layer 603, and a counter electrode 620 in order from the conductive substrate 14 side. In addition, the electrolyte 30 is disposed in the space above. The electrolyte 30 is impregnated into even the inside of the porous oxide semiconductor layer 13 and the porous insulating layer 603. Here, for example, a glass substrate or a resin film can be used as the insulating substrate 601. In addition, it is possible to use one which is the same as the counter electrode 20 as the counter electrode 620. Alternatively, the counter electrode 620 may be constituted by, for example, a porous single layer containing carbon or the like. The porous insulating layer 603 is used mainly to prevent the physical contact of the porous oxide semiconductor layer 13 with the counter electrode 620 and to impregnate the electrolyte 30 into the inside. As such a porous insulating layer 603, for example, a fired body of an oxide can be used. Meanwhile, in the dye-sensitized solar cell 600 illustrated in FIG. 14, only one structure 602 is provided in the space between the sealing portion 40, the conductive substrate 14 and the insulating substrate 601, but a plurality of structures 602 may be provided. In addition, the porous insulating layer 603 is provided between the porous oxide semiconductor layer 13 and the counter electrode 620 but may be provided between the conductive substrate 14 and the counter electrode 620 so as to surround the porous oxide semiconductor layer 13. It is possible to prevent the physical contact of the porous oxide semiconductor layer 13 with the counter electrode 620 by this constitution as well.

In addition, in the first and fifth embodiments above, the inner circumferential surface $S_1$ of the annular inorganic sealing portion 41 is covered with the thermosetting resin 45 so as to be protected from the electrolyte 30, but the thermosetting resin 45 is not necessarily required and thus can be omitted.

Moreover, in the first to fifth embodiments above, all or a part of the adhesive portions 42a, 342a, and 442a are provided on the side opposite to the electrolyte 30 with respect to the protruding portion 41b, but the position of the adhesive portions 42a, 342a, and 442a to the protruding portion 41b may be reversed. In other words, the protruding portion 41b may be provided on the side opposite to the electrolyte 30 with respect to all or a part of the adhesive portions 42a, 342a, and 442a. In this case, in the dye-sensitized solar cells 100, 200, 300, and 500 of the first to third and fifth embodiments, the expanding portion 42b is disposed to be closer to the electrolyte 30 side than the adhesive portion 42a.

In addition, in the first to third and fifth embodiments above, the expanding portion 42b connects the working electrode 10 with the counter electrode 20, but the expanding portion 42b may be adhered to only either of the working electrode 10 or the counter electrode 20 or may not be adhered to both of them.

Moreover, in the first to fifth embodiments above, the internal pressure of the cell space is less than the atmospheric pressure, but the internal pressure of the cell space may be equal to or higher than the atmospheric pressure.

EXAMPLES

Hereinafter, the content of the invention will be described more specifically with reference to Examples, but the invention is not limited to the following Examples.

Example 1

First, a transparent conductive glass substrate (FTO substrate) which is formed by providing an FTO film composed of fluorine-doped tin oxide on a glass substrate and which has 10 cm×10 cm×4 mm (thickness) was prepared. Subsequently, a paste for porous oxide semiconductor layer formation containing titanium oxide having an average particle size of 20 nm was coated on the FTO film of the FTO substrate by screen printing, dried, and then heat-treated at 500° C. for 1 hour, thereby forming a porous oxide semiconductor layer having a thickness of about 20 µm. The working electrode was prepared in this manner.

Next, a silver paste was coated on the FTO substrate of the working electrode by screen printing so as to surround the porous oxide semiconductor layer, dried, and then heat-treated at 500° C. for 1 hour, thereby forming a current collecting wiring which has a width of 500 µm, a height of 25 µm, and a continuous and annular shape.

Next, a paste containing a glass frit (melting point: 510° C.) was coated thereon by screen printing so as to cover the current collecting wiring, dried, and then heat-treated at 480° C. for 1 hour, thereby forming a wiring protective portion which has a width of 800 µm, a height of 40 µm from the FTO substrate, and a continuous and annular shape. The main body portion having a continuous and annular shape was formed in this manner. Subsequently, the same paste containing a glass frit as the paste used in the formation of the main body portion was coated on the region near the porous oxide semiconductor layer of the surface on the side opposite to the FTO substrate of the main body portion by screen printing, dried, and then heat-treated at 480° C. for 1 hour, thereby forming a protruding portion having a continuous and annular shape. At this time, the protruding portion was formed so as to have a height H of 40 µm from the main body portion and a width of 100 µm. An annular inorganic sealing portion was formed on the working electrode in this manner.

Subsequently, the photosensitizing dye was supported on the working electrode by immersing the working electrode in the solution prepared by dissolving 0.3 mM of ruthenium pyridine complex dye (N719 dye) that is a photosensitizing dye in a mixed solvent obtained by mixing acetonitrile and t-butyl alcohol at a volume ratio of 1:1 for whole day and night.

On the other hand, a metal substrate which has 5.5 cm×5.5 cm×40 µm (thickness) and is formed of a pure titanium metal foil was prepared, a platinum catalyst layer having a thickness of about 10 nm was formed on the entire surface of this metal substrate by a sputtering method, thereby obtaining a counter electrode.

Next, as the first sealing material, a quadrilateral annular body which is composed of a polyolefin-based hot melt resin, has a width of 5 mm, and in which one quadrilateral opening (5 cm×5 cm) is formed on the sheet of 10 cm×10 cm was prepared. Subsequently, the first sealing material was disposed on the inorganic sealing portion of the working electrode and then melted to be adhered thereto. Specifically, the first sealing material 42A was disposed so as to also cover the outer circumferential surface along the extending direction of the protruding portion as well as to cover the region on the outer side more than the main body portion of the surface of the FTO substrate and the entire surface on the side opposite to the electrolyte with respect to the protruding portion of the main body portion, and then is melted by heating to be adhered to the inorganic sealing portion and, thus fixed to the inorganic sealing portion. The first sealing material was formed on the working electrode in this manner. At this time, Himilan (trade name, manufactured by Du Pont-Mitsui Polychemicals Co., Ltd., melting point: 98° C.) of an ionomer was used as the polyolefin-based hot melt resin.

Next, as the second sealing material, a quadrilateral annular body which is composed of a polyolefin-based hot melt resin, has a width of 5 mm, and in which one quadrilateral opening (5 cm×5 cm) is formed on the sheet of 10 cm×10 cm was prepared. Subsequently, the second sealing material was disposed on the platinum catalyst layer of the counter electrode and then melted to be adhered thereto. The second sealing material was formed on the counter electrode in this manner. At this time, Himilan (melting point: 98° C.) was used as the polyolefin-based hot melt resin in the same manner as in the polyolefin-based hot-melt resin used in the formation of the first sealing material.

Subsequently, an electrolyte was added dropwise to the inner side of the annular inorganic sealing portion. At this time, as the electrolyte, an electrolyte composed of an ionic liquid containing iodine/iodide ion redox couple (hexylimidazolium iodide) and methoxypropionitrile was used.

Thereafter, the working electrode having the first sealing material fixed thereto and the counter electrode having the second sealing material fixed thereto were placed in a reduced pressure environment (500 Pa), and then the first sealing material and the second sealing material were overlapped each other. Thereafter, the first sealing material and the second sealing material were melted by heating at 160° C. using a heater while applying a pressure of 3 MPa and, thus a sealing portion was formed. A dye-sensitized solar cell was obtained in this manner. Meanwhile, when the cross-section of the dye-sensitized solar cell thus obtained was observed by an SEM, it was found that a part of the resin sealing portion was penetrated into between the protruding portion and the counter electrode. In addition, it was found that the resin sealing portion had an expanding portion expanding even to the side opposite to the electrolyte with respect to the adhesive portion and the expanding portion adhered to the both of the FTO substrate and the counter electrode.

Examples 2 to 6

The dye-sensitized solar cells were fabricated in the same manner as in Example 1 except that the height H of the protruding portion from the main body portion was set as presented in Table 1. Meanwhile, when the cross-section of the dye-sensitized solar cells obtained in Examples 2 to 6 was observed by an SEM, it was found that a part of the resin sealing portion was penetrated into between the protruding portion and the counter electrode. In addition, it was found that the resin sealing portion had an expanding portion expanding even to the side opposite to the electrolyte with respect to the adhesive portion and the expanding portion adhered to the both of the FTO substrate and the counter electrode.

Example 7

The dye-sensitized solar cell was fabricated in the same manner as in Example 1 except that the first sealing material and the second sealing material were pressurized at a pressure of 5 MPa at the time of forming the sealing portion so that the protruding portion and the counter electrode were in contact with each other. Meanwhile, when the cross-section of the dye-sensitized solar cell obtained in Example 7 was observed by an SEM, it was found that the resin sealing portion had an expanding portion expanding even to the side opposite to the electrolyte with respect to the adhesive portion and the expanding portion adhered to the both of the FTO substrate and the counter electrode.

Example 8

The dye-sensitized solar cell was fabricated in the same manner as in Example 1 except that the first sealing material was disposed so as to only cover the outer circumferential surface along the extending direction of the protruding portion and the surface on the side opposite to the electrolyte with respect to the protruding portion of the main body portion and the side opposite to the FTO substrate with respect to the main body portion, and then melted by heating to be adhered to the inorganic sealing portion at the time of fixing the first sealing material to the inorganic sealing portion so that the expanding portion was not formed. Meanwhile, when the cross-section of the dye-sensitized solar cell obtained in Example 8 was observed by an SEM, it was found that a part of the resin sealing portion was penetrated into between the protruding portion and the counter electrode. In addition, it was found that the resin sealing portion did not have an expanding portion expanding to the side opposite to the electrolyte with respect to the adhesive portion.

Example 9

The dye-sensitized solar cell was fabricated in the same manner as in Example 1 except that the protruding portion was formed at a position farthest from the porous oxide semiconductor layer of the surface on the side opposite to the FTO substrate of the main body portion, and the first sealing material was disposed so as to only cover the inner circumferential surface along the extending direction of the protruding portion and the surface on the electrolyte side with respect to the protruding portion of the main body portion and on the side opposite to the FTO substrate with respect to the main body portion, and then melted by heating to be adhered to the inorganic sealing portion at the time of fixing the first sealing material to the inorganic sealing portion so that the expanding portion was not formed. Meanwhile, when the cross-section of the dye-sensitized solar cell obtained in Example 9 was observed by an SEM, it was found that a part of the resin sealing portion was penetrated into between the protruding portion and the counter electrode. In addition, it was found that the resin sealing portion did not have an expanding portion expanding to the electrolyte side with respect to the adhesive portion.

Comparative Example 1

The dye-sensitized solar cell was fabricated in the same manner as in Example 1 except that a protruding portion was not formed on the main body portion.
[Evaluation on Durability]
The durability of the dye-sensitized solar cell was evaluated as follows. In other words, first, with regard to the dye-sensitized solar cells obtained in Examples 1 to 9 and Comparative Example 1, the photoelectric conversion efficiency after leaving to stand in a 85° C. and 58% RH environment for 1000 hours was measured, and the decreasing rate of the photoelectric conversion efficiency was calculated based on the following Equation:

Decreasing rate of photoelectric conversion efficiency (%)=initial photoelectric conversion efficiency (100%)−photoelectric conversion efficiency after leaving to stand for 1000 hours).

The results are presented in Table 1. Meanwhile, the durability was evaluated to be excellent so as to be denoted as "acceptable" in a case in which the decreasing rate of the photoelectric conversion efficiency is 10% or less and the durability was evaluated to be poor so as to be denoted as "unacceptable" in the case of exceeding 10%.

TABLE 1

| | Protruding portion | Height of protruding portion H (μm) | Melting point of protruding portion (° C.) | Expanding portion | Position of adhesive portion with respect to protruding portion | Presence or absence of adhesive portion between protruding portion and counter electrode | Melting point of adhesive portion (° C.) | Decreasing rate of photoelectric conversion efficiency (%) |
|---|---|---|---|---|---|---|---|---|
| Example 1 | Presence | 40 | 510 | Presence | Side opposite to electrolyte | Presence | 98 | 3 |
| Example 2 | Presence | 60 | 510 | Presence | Side opposite to electrolyte | Presence | 98 | 2 |
| Example 3 | Presence | 80 | 510 | Presence | Side opposite to electrolyte | Presence | 98 | 3 |
| Example 4 | Presence | 100 | 510 | Presence | Side opposite to electrolyte | Presence | 98 | 5 |
| Example 5 | Presence | 10 | 510 | Presence | Side opposite to electrolyte | Presence | 98 | 4 |
| Example 6 | Presence | 120 | 510 | Presence | Side opposite to electrolyte | Presence | 98 | 8 |
| Example 7 | Presence | 40 | 510 | Presence | Side opposite to electrolyte | Absence | 98 | 3 |
| Example 8 | Presence | 40 | 510 | Absence | Side opposite to electrolyte | Presence | 98 | 4 |
| Example 9 | Presence | 40 | 510 | Absence | Electrolyte side | Presence | 98 | 5 |
| Comparative Example 1 | Absence | — | — | — | — | — | 98 | 12 |

From the results presented in Table 1, the dye-sensitized solar cells of Examples 1 to 9 met the acceptance criteria in terms of durability. In contrast to this, it was found that the dye-sensitized solar cell of Comparative Example 1 did not meet the acceptance criteria in terms of durability.

Consequently, it was confirmed that excellent durability was exhibited even in a high temperature environment according to the dye-sensitized solar cell of the invention.

EXPLANATIONS OF LETTERS OR NUMERALS

- 10 ... working electrode (first electrode)
- 14 ... conductive substrate
- 20 ... counter electrode (counter substrate)
- 30 ... electrolyte
- 40, 240, 340, 440, and 540 ... sealing portion
- 41 and 541 ... inorganic sealing portion
- 41a and 541a ... main body portion
- 41b ... protruding portion
- $S_1$ ... outer circumferential surface (side surface)
- 42, 242, 342, and 442 ... resin sealing portion
- 42a, 342a, and 442a ... adhesive portion
- 42b ... expanding portion
- 43 ... current collecting wiring (main body portion)
- 44 ... wiring protective portion (main body portion)
- 100, 200, 300, 400, 500, and 600 ... dye-sensitized solar cell
- 601 ... counter substrate
- $S_4$ ... region in which adhesive portion is not adhered
- H ... height of protruding portion

The invention claimed is:

1. A dye-sensitized solar cell comprising:
   a conductive substrate;
   a counter substrate facing the conductive substrate;
   an electrolyte disposed between the conductive substrate and the counter substrate; and
   an annular sealing portion surrounding the electrolyte together with the conductive substrate and the counter substrate and connecting the conductive substrate and the counter substrate,
   wherein the sealing portion has
   an inorganic sealing portion fixed to the conductive substrate and including an inorganic material, and
   a resin sealing portion fixed to the counter substrate and including a resin material,
   the inorganic sealing portion has
   a main body portion provided on the conductive substrate, and
   a protruding portion extending from the main body portion toward a side opposite to the conductive substrate, and
   the resin sealing portion has an adhesive portion adhering the main body portion to the counter substrate, the adhesive portion being adhered to a side surface along an extending direction of the protruding portion.

2. The dye-sensitized solar cell according to claim 1, wherein a melting point of the protruding portion is higher than a melting point of the adhesive portion.

3. The dye-sensitized solar cell according to claim 1, wherein at least a part of the adhesive portion is provided on a side opposite to the electrolyte with respect to the protruding portion.

4. The dye-sensitized solar cell according to claim 3, wherein the resin sealing portion further has an expanding portion expanding to the side opposite to the protruding portion with respect to the adhesive portion, the expanding portion being adhered to a region not adhered with the adhesive portion of the main body portion of the inorganic sealing portion.

5. The dye-sensitized solar cell according to claim 1, wherein a height of the protruding portion extending from the main body portion is from 20 to 100 μm.

6. The dye-sensitized solar cell according to claim 1, further comprising a first electrode having the conductive substrate,
   wherein the counter substrate is constituted by a second electrode.

7. A method of manufacturing a dye-sensitized solar cell comprising:
   an inorganic sealing portion a forming step of forming an inorganic sealing portion including an inorganic material on a conductive substrate;
   a counter substrate preparing step of preparing a counter substrate;
   an electrolyte disposing step of disposing an electrolyte on the conductive substrate or the counter substrate; and
   a bonding step of forming a sealing portion between the conductive substrate and the counter substrate by bonding the conductive substrate with the counter substrate,
   wherein the inorganic sealing portion is formed so as to have a main body portion provided on the conductive substrate and a protruding portion extending from the main body portion toward a side opposite to the conductive substrate in the inorganic sealing portion forming step, and
   the sealing portion is formed so as to have the inorganic sealing portion and a resin sealing portion fixed to the counter substrate and including a resin material, and the resin sealing portion is formed so as to have an adhesive portion adhering the main body portion to the counter substrate and adhered to a side surface along an extending direction of the protruding portion in the bonding step.

8. The method of manufacturing a dye-sensitized solar cell according to claim 7, wherein a melting point of the protruding portion is higher than a melting point of the adhesive portion.

9. The method of manufacturing a dye-sensitized solar cell according to claim 7, wherein the sealing portion is formed such that at least a part of the adhesive portion is provided on a side opposite to the electrolyte with respect to the protruding portion in the bonding step.

10. The method of manufacturing a dye-sensitized solar cell according to claim 7, wherein the inorganic sealing portion is formed such that a height of the protruding portion from the main body portion is from 20 to 100 μm in the inorganic sealing portion forming step.

11. The method of manufacturing a dye-sensitized solar cell according to claim 7, further comprising a first electrode preparing step of preparing a first electrode having the conductive substrate,
   wherein the counter substrate is constituted by a second electrode.

* * * * *